(12) United States Patent
Liu

(10) Patent No.: US 8,717,065 B2
(45) Date of Patent: May 6, 2014

(54) DATA TRANMISSION DRIVER, SYSTEM AND METHOD

(76) Inventor: Yonghua Liu, Ottawa (CA)

(*) Notice: Subject to any disclaimer, the term of this patent is extended or adjusted under 35 U.S.C. 154(b) by 84 days.

(21) Appl. No.: 13/507,811

(22) Filed: Jul. 31, 2012

(65) Prior Publication Data

US 2013/0223559 A1    Aug. 29, 2013

Related U.S. Application Data

(63) Continuation-in-part of application No. 12/380,392, filed on Feb. 27, 2009, now Pat. No. 8,274,311.

(51) Int. Cl.
*H03K 19/0175* (2006.01)

(52) U.S. Cl.
USPC .............................. 326/86; 375/288; 327/108

(58) Field of Classification Search
USPC .......... 326/82–83, 86–87; 327/108–109, 112; 375/286, 288
See application file for complete search history.

(56) References Cited

U.S. PATENT DOCUMENTS

| | | | | |
|---|---|---|---|---|
| 6,226,330 | B1* | 5/2001 | Mansur | 375/257 |
| 6,317,465 | B1* | 11/2001 | Akamatsu et al. | 375/257 |
| 6,452,420 | B1* | 9/2002 | Wong | 326/86 |
| 6,480,548 | B1* | 11/2002 | Mansur | 375/242 |
| 7,167,523 | B2* | 1/2007 | Mansur | 375/242 |
| 7,394,872 | B2* | 7/2008 | Moon | 375/318 |
| 7,508,881 | B2* | 3/2009 | Choi et al. | 375/288 |
| 7,692,563 | B2* | 4/2010 | Hamada et al. | 341/56 |
| 2007/0160155 | A1* | 7/2007 | Choi | 375/257 |
| 2009/0225873 | A1* | 9/2009 | Lee et al. | 375/257 |

* cited by examiner

*Primary Examiner* — Jason M Crawford

(57) ABSTRACT

A system and method are provided for transmission of data bits across a data bus. To reduce power usage, noise, or some combination of the two, the data bus utilizes differential transmission using a three level signal in which a reference signal signifies no difference between input bits. Before the signals are transmitted an analysis is made to choose which one of a set of predetermined polarity reversal combinations is advantageous to encode the data bits. The data bits are so encoded and a formatting value F associated with the chosen polarity reversal is differentially transmitted with the encoded bits over the data bus. The three level differential signal is received at the far end of the bus, the encoded bits are recovered and decoded with use of F. The system and method achieves up to N bits transmitted per N data lines.

4 Claims, 19 Drawing Sheets

DATA TRANSMISSION DRIVER, SYSTEM AND METHOD

RELATED APPLICATION

This application is a continuation-in-part of prior U.S. patent application Ser. No. 12/380,392 filed Feb. 27, 2009 now U.S. Pat. No. 8,274,311.

FIELD OF THE INVENTION

The invention relates to data transmission and more particularly to the reduction of noise and power consumption, and increased line capacity for data transmission over line conductors of a data bus.

BACKGROUND OF THE INVENTION

A number of factors affect the efficiency and usability of a set of conductors utilized for data transmission. Some of these factors include noise generated between neighboring lines, the power consumption required to use a single line, and the number of lines needed to convey the desired amount of data. In cases where the data lines compose a data bus having higher bandwidth such as those found in processors, semiconductor chips, on PCBs (printed circuit boards), high speed buses connecting electronic devices, and elsewhere, each of these factors becomes extremely important due to the relatively small size and high data rates demanded from the data bus, and the always constant need to conserve power to keep temperatures under control.

SUMMARY OF THE INVENTION

According to a first broad aspect, the invention provides a driver for differentially transmitting data. The driver has a plurality of driver cells ($D_0, \ldots, D_N$) for receiving a first signal, a second signal, and an ordered set of N input signals ($B_0, \ldots, B_{N-1}$). The driver cells include a first driver cell ($D_0$) for receiving over a first input of $D_0$ the first signal and for receiving over a second input of $D_0$ a first input signal ($B_0$). The first driver differentially generates over an output of $D_0$ a first 3-level transmission signal ($S_0$) from a difference between $B_0$ and the first signal. The driver cells include an (N+1)th driver cell ($D_N$) for receiving over a first input of $D_N$ an Nth input signal ($B_{N-1}$) and for receiving over a second input of $D_N$ the second signal. The (N+1)th driver cell generates over an output of $D_N$ an (N+1)th 3-level transmission signal ($S_N$) from a difference between $B_{N-1}$ and the second signal. The driver cells also include N−1 driver cells ($D_j, \ldots, D_{N-1}$), each jth driver cell ($D_j$) of which is for receiving over a first input of $D_j$ a (j−1)th input signal ($B_{j-1}$) and for receiving over a second input of $D_j$ a jth input signal ($B_j$). Each jth driver cell ($D_j$) generates a (j+1)th 3-level transmission signal ($S_j$) from a difference between $B_j$ and $B_{j-1}$.

In some embodiments, the first input of $D_0$ and the second input of $D_N$ are each coupled to a respective digital voltage.

In some embodiments, the first input of $D_0$ is coupled to a digital voltage, and the second signal comprises an (N+1)th input signal ($B_N$).

In some embodiments, the first reference signal and the second reference signal comprise an (N+1)th input signal ($B_N$).

In some embodiments, each driver cell in generating each transmission signal generates a reference signal "0(Z)" in a case where a signal received over the first input of the driver cell is equal to a signal received over the second input of the driver cell.

In accordance with a second broad aspect, the invention provides a data transmission system for differentially transmitting data across a data bus of N+1 data lines. The system has a driver for receiving a first signal, a second signal, and an ordered set of N input signals ($B_0, \ldots, B_{N-1}$). The driver is coupled to a first end of the data bus and is for transmitting the transmission signals from the first end of the data bus. A receiver is coupled to a second end of the data bus and receives the transmission signals at the second end of the data bus. The driver has N+1 driver cells ($D_0, \ldots, D_N$) including a first driver cell ($D_0$) for receiving over a first input of $D_0$ the first signal and for receiving over a second input of $D_0$ a first input signal ($B_0$). $D_0$ differentially generates over an output of $D_0$ a first 3-level transmission signal ($S_0$) from a difference between $B_0$ and the first signal. An (N+1)th driver cell ($D_N$) receives over a first input of $D_N$ an Nth input signal ($B_{N-1}$) and receives over a second input of $D_N$ the second signal. $D_N$ generates over an output of $D_N$ an (N+1)th 3-level transmission signal ($S_N$) from a difference between $B_{N-1}$ and the second signal. The driver also includes N−1 driver cells ($D_j, \ldots, D_{N-1}$), each jth driver cell ($D_j$) of which is for receiving over a first input of $D_j$ a (j−1)th input signal ($B_{j-1}$) and for receiving over a second input of $D_j$ a jth input signal ($B_j$). Each jth driver cell ($D_j$) generates a (j+1)th 3-level transmission signal ($S_j$) from a difference between $B_j$ and $B_{j-1}$.

In some embodiments, each driver cell in generating each 3-level transmission signal generates a reference signal "0(Z)" in a case where a signal received over the first input of the driver cell is equal to a signal received over the second input of the driver cell.

In some embodiments, the receiver includes N receiver cells ($RX_0, \ldots, RX_{N-1}$), each ith receiver cell ($RX_i$) of which is for receiving over a first input of $RX_i$ an ith transmission signal ($S_i$) and for receiving over a second input of $RX_i$ an (i+1)th transmission signal ($S_{i+1}$). Each $RX_i$ generates an ith direct output ($DBIT_i$) which equals: 1 in a case where $S_{i+1}$ is less than $S_i$, 0 in a case where $S_{i+1}$ is greater than $S_i$, and a high impedance state "HZ" or floating output in a case where $S_{i+1}$ equals $S_i$. Each $RX_i$ also generates an ith indirect output ($INDBIT_i$) which equals: 0 in a case where $S_{i+1}$ is less than $S_i$, 0 in a case where $S_{i+1}$ is greater than $S_i$, and 1 in a case where $S_{i+1}$ equals $S_i$. The receiver also has N restore cells ($R_0, \ldots, R_{N-1}$) including a first restore cell ($R_0$), for receiving over a first input of $R_0$ a first direct bit ($DBIT_0$) and over a second input of $R_0$ a first indirect bit ($INDBIT_0$). The first restore cell ($R_0$) generates a first output bit ($OUT_0$) of $R_0$ which equals $DBIT_0$ when $INDBIT_0$ equals 0 and is coupled to a third signal when $INDBIT_0$ equals 1. An Nth restore cell ($R_{N-1}$) receives over a first input of $R_{N-1}$ an Nth direct bit ($DBIT_{N-1}$) and over a second input of $R_{N-1}$ an Nth indirect bit ($INDBIT_{N-1}$). The Nth restore cell ($R_{N-1}$) generates an Nth output bit ($OUT_{N-1}$) of $R_{N-1}$ which equals $DBIT_{N-1}$ when $INDBIT_{N-1}$ equals 0 and is coupled to a fourth signal when $INDBIT_{N-1}$ equals 1. The N restore cells include N−2 restore cells ($R_1, \ldots, R_{N-2}$), each kth restore cell ($R_k$) of which is for receiving over a first input of $R_k$ a kth direct bit ($DBIT_k$) and over a second input of $R_k$ a kth indirect bit ($INDBIT_k$). Each kth restore cell ($R_k$) generates a kth output bit ($OUT_k$) of $R_k$ which equals $DBIT_k$ when $INDBIT_k$ equals 0, and generates a kth output bit $OUT_k$ of $R_k$ which equals an output $OUT_{k+1}$ of the (k+1)th recover cell $R_{k+1}$ and an output $OUT_{k-1}$ of the (k−1)th recover cell $R_{k-1}$ when $INDBIT_k$ equals 1.

In accordance with a third broad aspect, the invention provides a method of differentially transmitting data across a data bus. The method includes predicting 3-level differentially generated transmission signals resulting from input data bits of the data. The predicted transmission signals are analyzed. A predetermined polarity reversal combination and an associated formatting value F are chosen from the analysis of the predicted transmission signals. The data bits are encoded by reversing polarity of the data bits according to the predetermined polarity reversal combination to generate encoded bits. Differential 3-level transmission signals are generated from the encoded bits and F, wherein F is for use in decoding the encoded bits. The differentially generated 3-level transmission signals are transmitted from a first end of the data bus.

In some embodiments, the analysis of the predicted transmission signals involves determining a first number of the predicted transmission signals which are non-reference signals and determining a second number of the predicted transmission signals which are reference signals. The predetermined polarity reversal combination and the associated formatting value F are chosen so that in a case where the first number is greater than the second number a polarity reversal of all of the bits and an associated formatting value F of a first value are chosen, and in a case where the first number is not greater than the second number a polarity reversal of none of the bits and an associated formatting value F of a second value are chosen.

In some embodiments, the analysis of the predicted transmission signals involves determining which of the predicted transmission signals are reference signals and determining which of the predicted transmission signals are non-reference signals. The predetermined polarity reversal combination and the associated formatting value F are chosen by: choosing a particular predetermined polarity reversal combination which results in a reduced number of transmission signals which are non-reference signals and choosing an F value associated with said particular predetermined polarity reversal combination.

In some embodiments, the analysis of the predicted transmission signals involves comparing the predicted transmission signals with previously transmitted signals. The predetermined polarity reversal combination and the associated formatting value F are chosen by: choosing a particular predetermined polarity reversal combination which results in a reduced number of predicted transmission signals which are different from the previously transmitted signals and choosing an F value associated with the particular predetermined polarity reversal combination.

In some embodiments, the analysis of the predicted transmission signals involves comparing the predicted transmission signals with previously transmitted signals; determining which of the predicted transmission signals are different from the previously transmitted signals; determining which of the predicted transmission signals are reference signals; and determining which of the predicted transmission signals are non-reference signals. The predetermined polarity reversal combination and the associated formatting value F are chosen by choosing a particular predetermined polarity reversal combination which results in at least one of: a reduced number of predicted transmission signals which are different from the previously transmitted signals, and a reduced number of transmission signals being non-reference signals. An F value associated with the particular predetermined polarity reversal combination is chosen.

In some embodiments, the method involves receiving the transmission signals at a second end of the data bus; recovering said encoded bits and F; determining the predetermined polarity reversal combination associated with F; decoding the encoded bits by reversing polarity of the encoded bits according said predetermined polarity reversal combination, generating decoded bits; and outputting the decoded bits.

In some embodiments, the method involves receiving the transmission signals at a second end of the data bus and recovering said encoded bits and F. The encoded bits are decoded by reversing the polarity of all the encoded bits in a case F equals the first value and reversing the polarity of none of the encoded bits in a case F equals the second value. The decoded bits are then outputted.

In some embodiments, the method involves receiving said transmission signals at a second end of said data bus; recovering said encoded bits and F; determining the predetermined polarity reversal combination associated with F; decoding the encoded bits by reversing polarity of the encoded bits according to said predetermined polarity reversal combination, generating decoded bits; and outputting the decoded bits.

In accordance with a fourth broad aspect the invention provides a method of differentially transmitting data. The method involves for a first input signal ($B_0$), generating a first 3-level transmission signal ($S_0$) from a difference between $B_0$ and a first other signal. For an Nth input signal ($B_{N-1}$), an (N+1)th 3-level transmission signal ($S_N$) is generated from a difference between $B_{N-1}$ and a second other signal. For each jth input signal $B_j$ of N−1 input signals ($B_1, \ldots, B_{N-2}$), a jth 3-level transmission signal ($S_j$) is generated from a difference between $B_j$ and $B_{j-1}$.

In accordance with a fifth broad aspect the invention provides a driver for differentially transmitting data over first and second data lines. The driver includes driver cells for receiving a first signal having a digital voltage, a first input signal, and a second input signal, the first input signal and the second input signal including data. The driver cells include a first driver cell for receiving over a first input of the first driver cell the first signal and for receiving over a second input of the first driver cell the first input signal, and for generating over an output of the first driver cell a first 3-level transmission signal from a difference between the first signal and the first input signal. The driver cells also include a second driver cell coupled to the first driver cell for receiving over a first input of the second driver cell the first input signal and for receiving over a second input of the second driver cell the second input signal, and for generating over an output of the second driver cell a second 3-level transmission signal from a difference between the first input signal and the second input signal.

In accordance with a sixth broad aspect the invention provides a data transmission system for differentially transmitting data across first and second data lines. The data transmission system includes a driver for receiving a first signal comprising a digital signal and an ordered set of a first input signal and a second input signal, the first input signal and the second input signal comprising data, wherein the driver is coupled to first ends of the first and second data lines for transmitting the data from the first end of the first ends of the first and second data lines. The data transmission system also includes a receiver coupled to second ends of the first and second data lines for receiving said transmission signals at the second end of the first and second data lines. The driver includes a first driver cell for receiving over a first input of the first driver cell the first signal and for receiving over a second input of the first driver cell the first input signal, and for generating over an output of the first driver cell a first 3-level transmission signal from a difference between the first signal and the first input signal. The driver also includes a second driver cell coupled to the first driver cell for receiving over a first input of the second driver cell the first input signal and for receiving over a second input of the second driver cell the second input signal, and for generating over an output of the second driver cell a second 3-level transmission signal from a difference between the first input signal and the second input signal.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
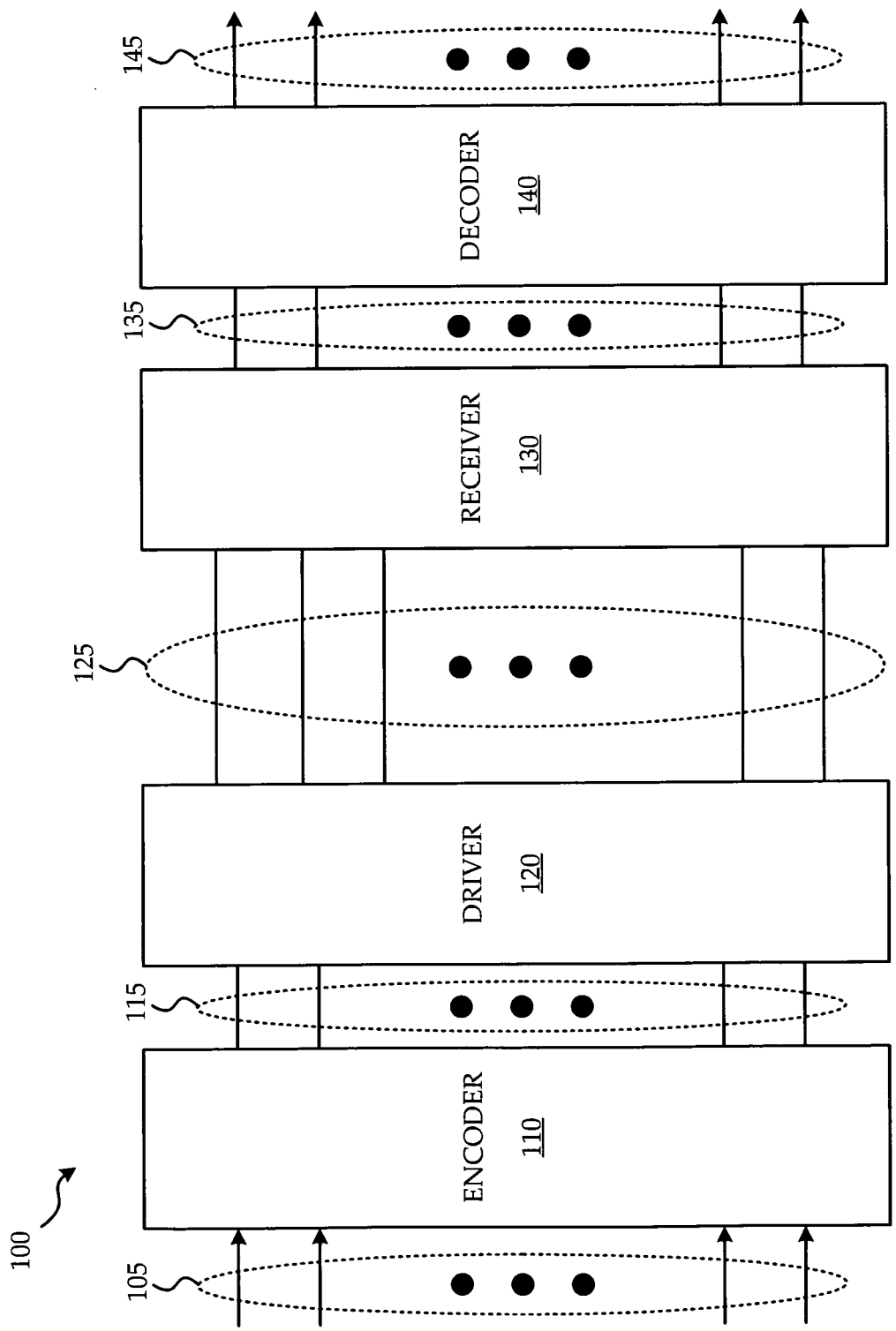
FIG. 1 is a schematic block diagram illustrating a data transmission system according to a preferred embodiment of the invention.

Referring to FIG. 1, a differential data transmission system, in accordance with an embodiment of the invention, generally indicated by 100 is shown. The system 100 has an encoder 110, a driver 120, a receiver 130, and a decoder 140. K data input lines 105 are coupled to the encoder 110. N data lines 115 couple the encoder 110 and the driver 120. In the preferred embodiment K is an integer greater than or equal to two. N+1 data transmission lines 125 form a data bus and couple the driver 120 and the receiver 130. N recovered data lines 135 couple the receiver 130 and the decoder 140. The decoder 140 is coupled to K data output lines 145.

The encoder 110 receives K input data bits over the data input lines 105 and encodes the data bits to produce K encoded data bits and transmits them over K of the data lines 115. As is discussed further below N−K=J data lines 115 are reserved for an optional formatting value F. The driver 120 receives the K encoded data bits and the formatting value F and operates on the encoded data bits and the optional formatting value F to produce N+1 3-level differential data signals also referred to as transmission or transmitted signals. In particular, the levels of the 3-level data signals include a low level signal, a high level signal, and a reference signal. For convenience a low or high level signal will also be referred to as a non-reference signal. Responsive to receiving the 3-level data signals over the data transmission lines 125 the receiver 130 operates on the N+1 3-level data signals to recover the K encoded data bits and the optional formatting value F. The decoder 140 receives the K encoded data bits over the recovered data lines 135 and uses F to decode them and to produce K output data bits which are output over the data output lines 145. The K output data bits output over the data output lines 145 correspond to the K input data bits input over the input lines 105.

The encoder 110 operates on the K input data bits to provide an improved transmission characteristic of the data bus which may include reducing power consumption and/or transient noise.

Figure 6:
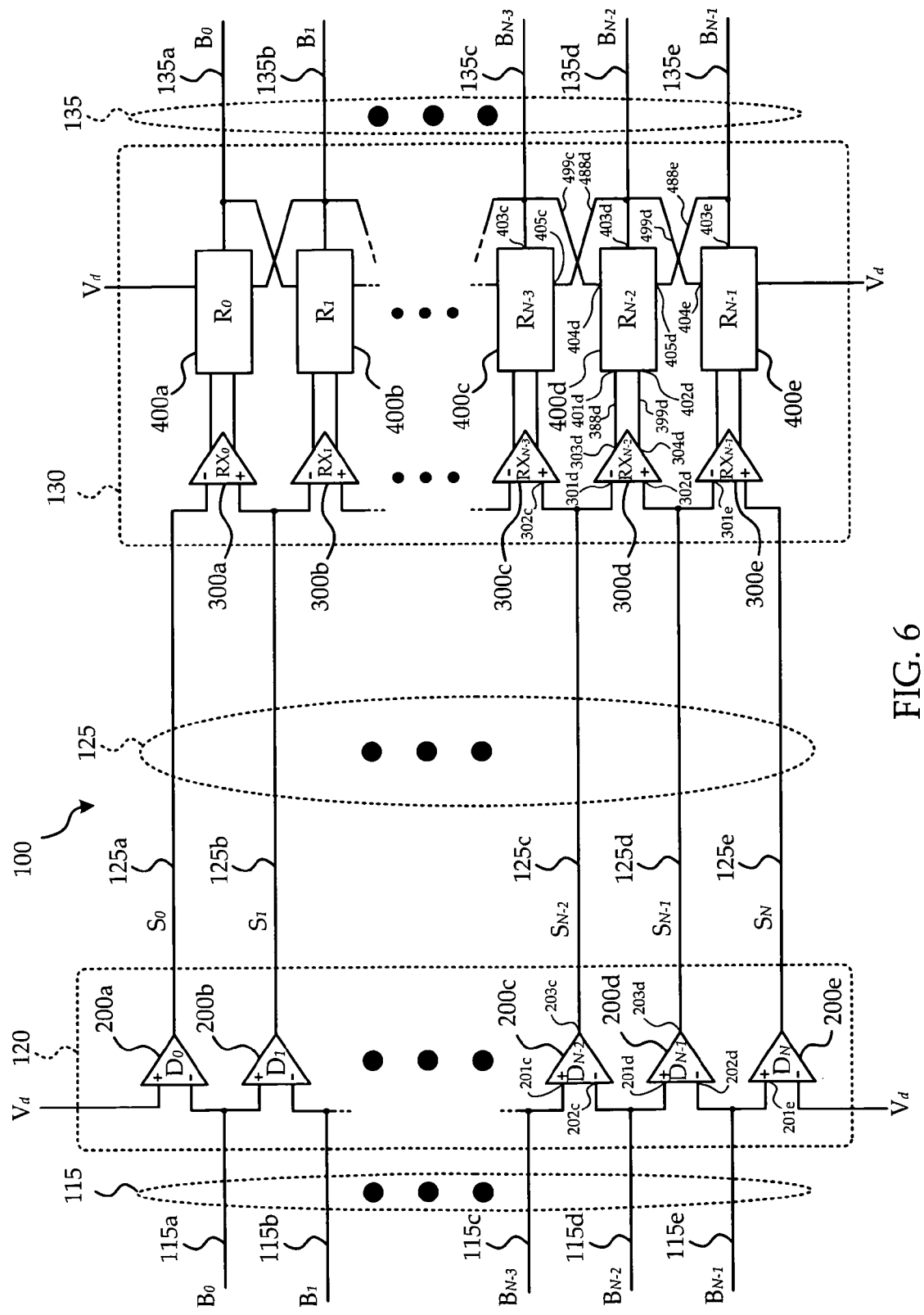
FIG. 6 is a schematic diagram illustrating the driver and the receiver of the data transmission system depicted in FIG. 1.

As will be seen more clearly in association with FIG. 6, the preferred embodiments provide for improved efficient use of data lines of the data bus. In the prior art, transmission of 3K data bits requires 4K data lines which is ¾ bits per line. In the preferred embodiments, K data bits requires K+1+J data lines (where J is the number of bits reserved for the formatting value) which is K/(K+1+J) bits per line. In a particular embodiment described below, K data bits can be transmitted using only K+J data lines which is K/(K+J). This number can approach 1 bit per line as the number of lines increases, and this results in power reduction and bandwidth efficiency. Furthermore, as discussed above, the use of a formatting value is optional. As such, in yet another embodiment J=0 and K data bits can be transmitted using only K, wherein the ratio of data bits to data lines is 1.

Figure 2:
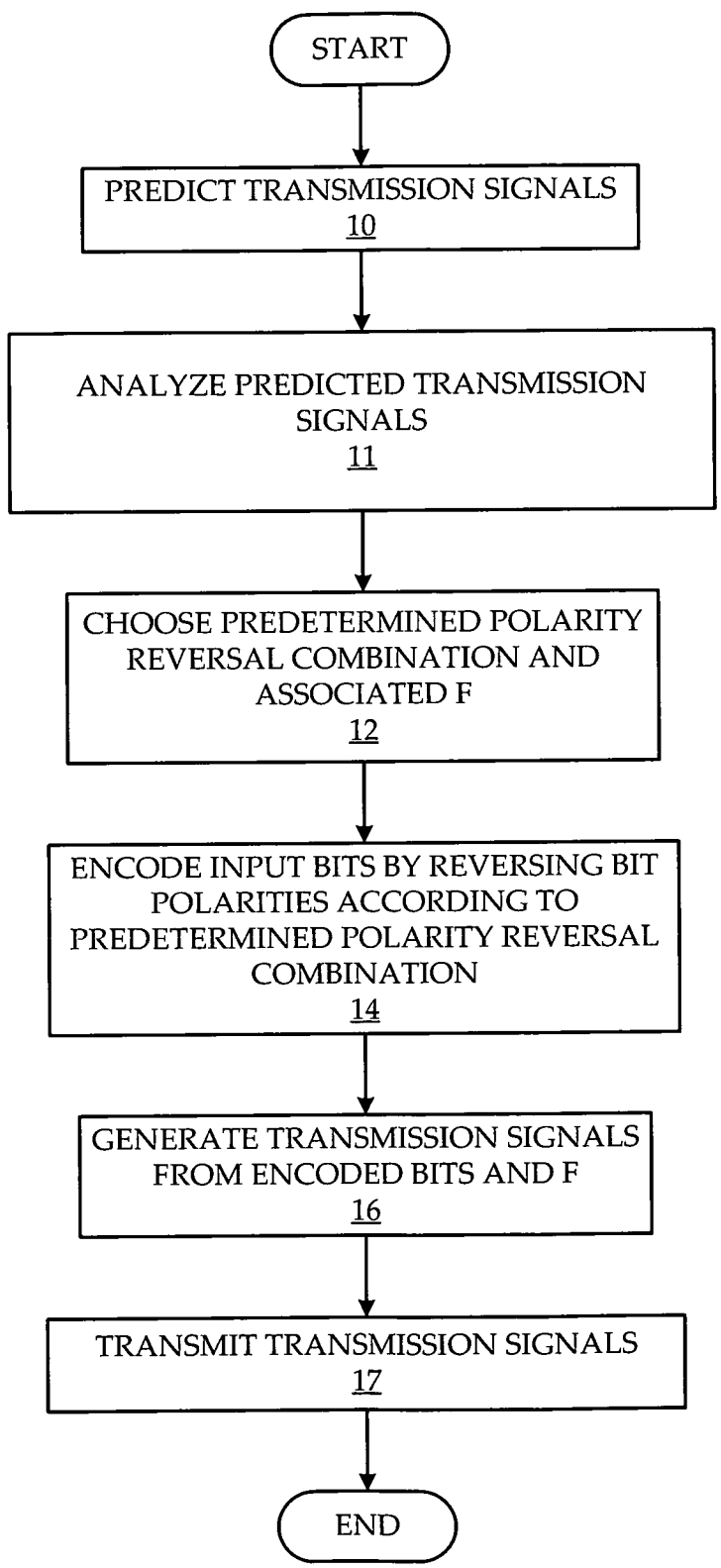
FIG. 2 is a functional block diagram illustrating the steps of a method of encoding and transmitting a number of input data bits according to an embodiment of the invention.

Referring to FIG. 2, shown is a flow chart of a method of encoding and transmitting data as applied by the encoder 110 and driver 120 of FIG. 1. At step 10 the transmission signals are predicted resulting in an anticipated number of 3-level data signals to be transmitted having a high level (hereinafter "+1") or a low level (hereinafter "−1") and an anticipated number of 3-level data signals to be transmitted having a reference level (hereinafter "0(Z)"). These predicted transmission signals are determined from the logic level of the input data bits. At step 11 the encoder analyzes the predicted transmission signals which may include comparing them with previously transmitted signals. The analysis performed in step 11 provides information to assist in choosing which one of a set of predetermined polarity reversal combinations is to be chosen along with its associated formatting value F in step 12. Each polarity reversal combination uniquely specifies a combination of input bits which are to be reversed in polarity during the process of encoding so as to improve transmission characteristics of the transmitted signals. In some embodiments the polarities of the input bits are controlled based on the proportion of predicted transmission signals being reference signals to the proportion of predicted transmission signals being non-reference signals. In these cases reducing power consumption is a priority. When the receiver is biased at the reference level, transmission at the reference level requires less power. As such, to reduce power consumption the polarities of the input bits are controlled to ensure that the number of transmission signals which are reference signals is greater than the number of transmission signals which are non-reference signals. In some embodiments the polarities of the input bits are controlled based on an analysis of the number of predicted transmission signals which are different from the previously transmitted signals. In cases where noise reduction is a priority, the polarities of the input bits are controlled so as to minimize the number of predicted transmission signals which are different from the previously transmitted signals. Sudden changes in the signal being transmitted along that data line causes transient noise, which can cause Electro-magnetic Interference (EMI). Reducing the number of changes in the signal being transmitted reduces the resulting transient noise, and hence reduces the resulting EMI.

In order to recover the original bit values of the input bits after changing the polarities of the input bits in order to improve the transmission characteristics of the transmitted signals over the transmission lines 125, the formatting value F is also transmitted so that the decoder 140 may apply the polarity reversal a second time to reverse the original reversal and generate the output bits. The formatting value F may be one or more bits in length depending upon the complexity of the analysis performed in step 11. In a preferred embodiment the bit length of F is equal to N minus K. Each possible value of F is associated with one predetermined polarity reversal combination to be applied to the input bits. At step 14 the input bits are encoded according to the predetermined polarity reversal combination by reversing the polarity of specific input bits indicated in the combination. At step 16 the transmission signals are generated from the encoded bits and F, and the transmission signals are transmitted in step 17. In the embodiment depicted in FIG. 1, the transmission signals are generated in the driver 120 and are also transmitted from the driver 120.

In a preferred embodiment, one predetermined combination of polarity reversal specifies that none of the input bits are to be reversed in polarity.

In some embodiments, an F value of j bits can signify $2^j$ predetermined polarity reversal combinations. In one embodiment, each bit of an F value made up of j bits could specify, in the predetermined associated polarity reversal combination, reversal or non-reversal of polarity of one of $2^j$ preset groupings of input data bits. In the case where F is a single bit value, it could be used to specify whether or not a single grouping of input data bits are to be reversed in polarity or not. This single grouping could be a predetermined subset of the input data bits, for example, all the even bits, all the odd bits, some contiguous grouping of bits such as the first half or third of the bits, or even all of the bits. As is described below, in one embodiment F is a single bit value that specifies whether or not all of the input data bits should be reversed in polarity or not. As was the case where F has one bit, in the case where F is made up of j bits, each bit of F could separately specify whether or not the associated predetermined polarity reversal combination a specific grouping of input data bits are to be reversed in polarity or not. In one embodiment, the input data bits are subdivided into j groups of bits, each group being subject to a reversal or non-reversal of polarity by predetermined polarity reversal combinations as signified by each bit of F. For example, in an embodiment in which F is three bits long, the input data bits could be subdivided into three groups. Each of the bits of F could then be used to signify that the predetermined polarity reversal combination reverses a corresponding group of the input data bits if it is determined that the corresponding group of input data bits should be reversed. It should be noted that the j groups of input data bits could be overlapping, and that each bit of F need not correspond to a particular group of bits. In one embodiment where F is two bits, a value of "00" could signify reversal of no input data bits, a value of "01" could signify reversal of all the odd bits, a value of "10" could signify reversal of all the even bits, and a value of "11" could signify reversal of all the bits.

Given a set of predetermined polarity reversal combinations, choosing which of the predetermined polarity reversal combinations is to be used for encoding is determined by analyzing the predicted transmission signals that would result from the input data bits as they are. In some embodiments the predicted transmission signals are compared with the previously transmitted signals. The predetermined polarity reversal combination is chosen to reduce the number of transmission signals which are different from the previously transmitted signals. This kind polarity reversal is performed for the reduction of transient noise and EMI caused by changes in the values of the transmission signals over time. In some embodiments, the predicted transmission signals are analyzed for the number of transmission signals which are non-reference signals and for the number of transmission signals which are reference signals. In this kind of embodiment, the predetermined polarity reversal combination is chosen to reduce the number of transmission signals which are non-reference signals. This kind of polarity reversal is performed for the reduction of powerconsumption. In other embodiments, the predetermined polarity reversal combination is chosen based on a prioritization of the goals of reducing noise caused by changes in the values of the transmission signals and reducing power utilized, and in other embodiments the predetermined polarity reversal combination is chosen based on a combination of these goals.

In some embodiments the analysis of which predetermined polarity reversal combination should be used takes into account the resulting transmission signals including F as well. In such an embodiment all possible sets of transmission signals made up of the encoded bits and the accompanying F bits are compared to each other for the considerations of power and noise described above.

Figure 3:
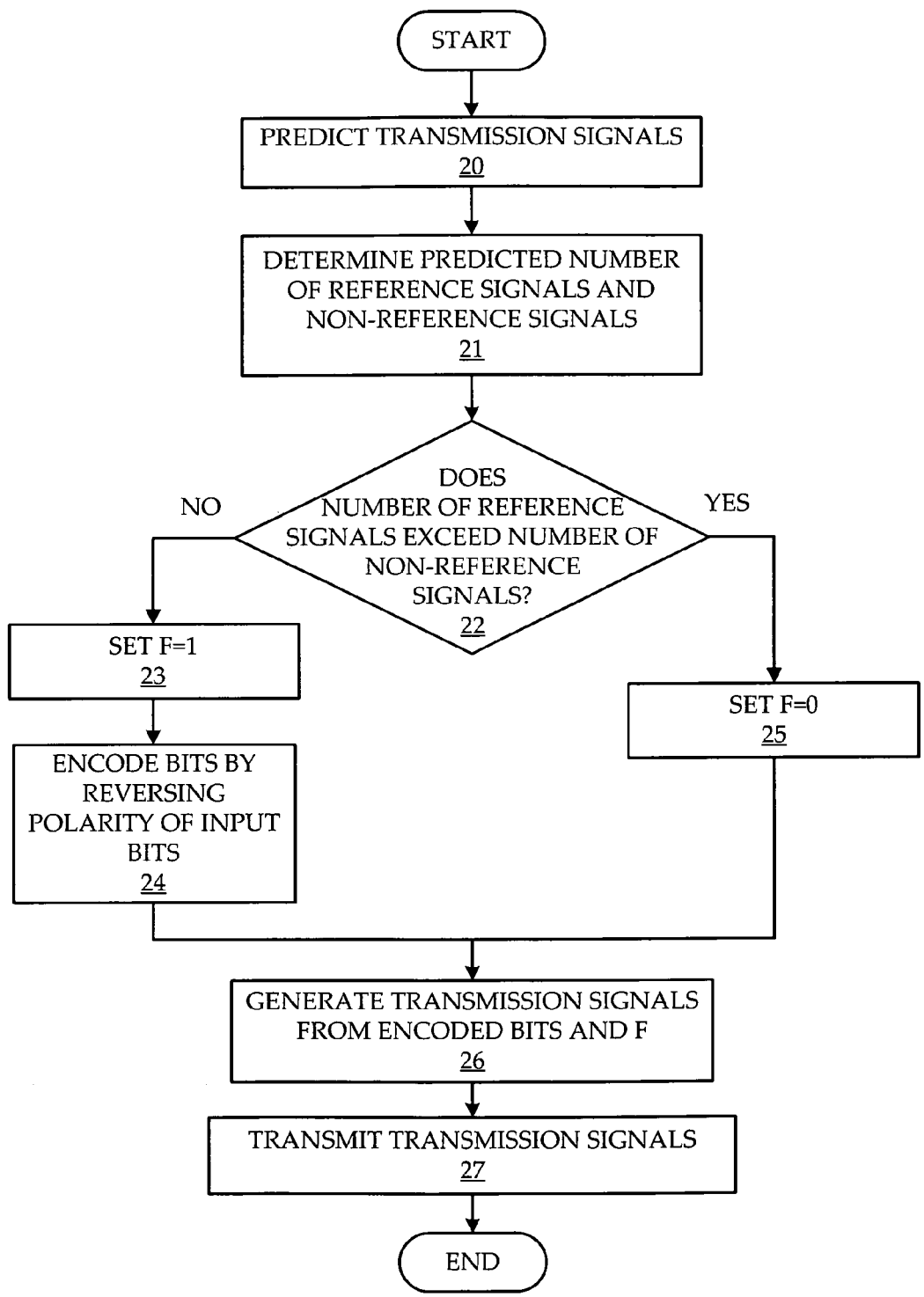
FIG. 3 is a functional block diagram illustrating the steps of the method of encoding and transmitting a number of input data bits according to a specific embodiment of the invention.

With reference to FIG. 3, a number of steps for encoding carried out by a particular embodiment of the invention will now be described. At step 20 transmission signals are predicted. In this particular embodiment power savings by maximizing the number of transmitted reference signals is a priority. At step 21 the analysis proceeds by determining the predicted number of reference signals and the predicted number of non-reference signals. At step 22 it is evaluated whether or not the number of predicted reference signals exceeds the number of predicted non-reference signals. If the number of reference signals exceeds the number of non-reference signals, the method proceeds to step 25 and F is set to "0" and none of the input bits undergo a reverse in polarity. If the number of reference signals does not exceed the number of non-reference signals, then the method proceeds to step 23 and F is set to "1". At step 24 the input bits are encoded by a reversing of their polarity. At step 26 the transmission signals are generated from the encoded bits and F, and finally at step 27 these transmission signals are transmitted.

Figure 4:
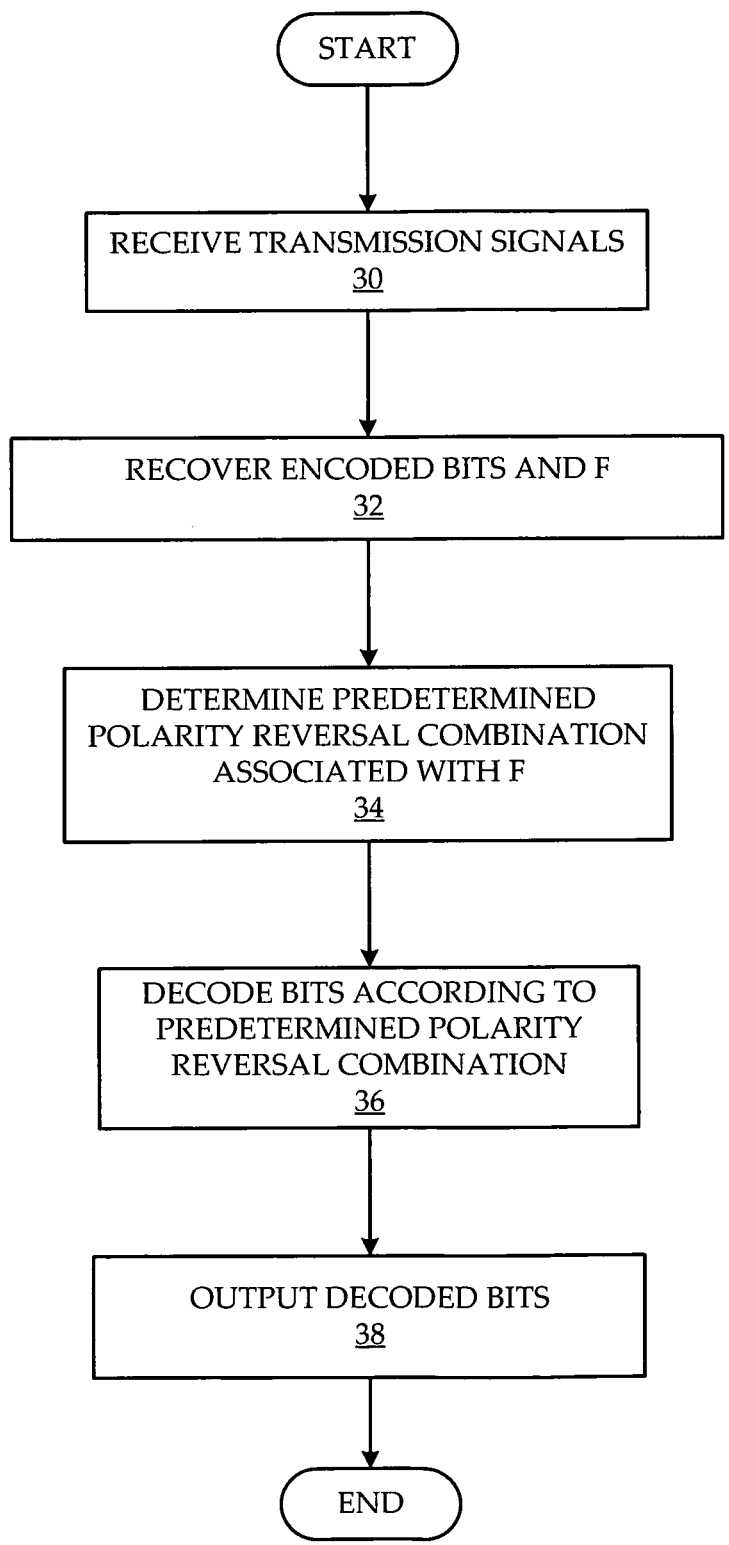
FIG. 4 is a functional block diagram illustrating the steps of a method of receiving and decoding a number of input data bits according to the embodiment illustrated in FIG. 2.

Referring now to FIG. 4, a number of steps for receiving and decoding transmission signals according to an embodiment of the invention are now described. At the receiver, the transmission signals are received at step 30. At step 32, the encoded bits and F are recovered from the three-level transmission signals. At step 34, the predetermined polarity reversal combination associated with F is determined. At step 36, the encoded bits are decoded according to the predetermined polarity reversal combination. Decoding is performed by applying the polarity reversal of the combination to the encoded bits a second time which acts to reverse the operation of encoding described above in association with FIG. 2. The resulting decoded bits have the same value as the input data bits. At step 38 the decoded bits are output.

Figure 5:
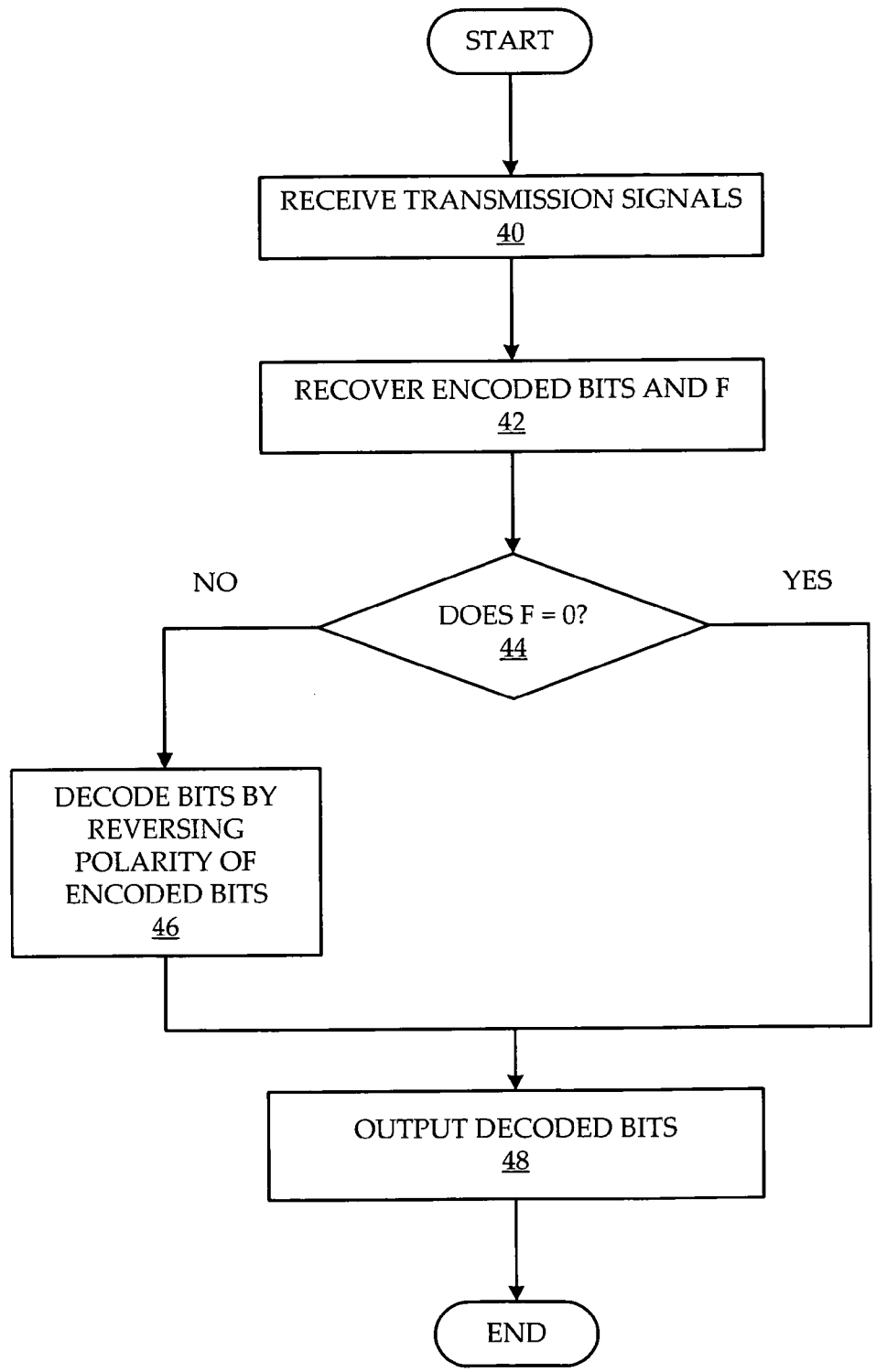
FIG. 5 is a functional block diagram illustrating the steps of a method of receiving and decoding a number of input data bits according to the specific embodiment illustrated in FIG. 3.

Referring now to FIG. 5, a number of steps for receiving and decoding transmission signals according to the particular embodiment depicted in FIG. 3 are now described. At step 40 the transmission signals are received in a receiver, and at step 42 the encoded bits and F are recovered from the received transmission signals. At step 44, F is evaluated. If F equals "0", then the encoded bits are not altered and they become the decoded bits. If F equals "1" at step 44, then the encoded bits are decoded by reversing the polarity of the encoded bits. The resulting decoded bits have the same value as the input data bits. At step 48 the decoded bits are output.

Referring to FIG. 6, shown is a block diagram of the driver 120 and the receiver 130 of FIG. 1. The driver 120 has N+1 driver cells ($D_0, \ldots, D_N$). Only five driver cells, the first 200a, second 200b, (N−1)th 200c, Nth 200d, and (N+1)th 200e are shown for convenience. Each of the driver cells 200a, 200b, 200c, 200d, 200e is coupled to a reference voltage $V_{RF}$ (not shown). Each one of N inputs signals $B_j$ (j=0 to N−1), of which only the first $B_0$, second $B_1$, (N−2)th $B_{N-3}$, (N−1)th $B_{N-2}$, and Nth $B_{N-1}$, are shown, is coupled to a respective two of the driver cells 200a, 200b, 200c, 200d, 200e over respective N data lines 115a, 115b, 115c, 115d, 115e. The input signals $B_0, B_1, \ldots, B_{N-1}$ correspond to the encoded bits and F as discussed above. The first 200a and (N+1)th 200e driver cells are each coupled to a digital voltage $V_d$. Each one of the N+1 driver cells 200a, 200b, 200c, 200d, 200e produces a respective transmission signal $S_i$, where i is an integer with i=0 to N. The transmission signals $S_i$ are 3-level transmission signals referred to above, each having one the following three possible levels: high level ("+1"); low level ("−1"); and reference ("0(Z)"). The three possible values correspond to actual values in the circuit as follows: "+1" is associated with an actual voltage $V_H$, "−1" is associated with an actual voltage of $V_L$, and "0(Z)" is associated with the reference voltage $V_{RF}$. As a will be described below, a transmission signal $S_j$ output from a particular driver cell $D_i$ is a transmission signal which represents the driver cell's first input minus the driver cell's second input. For example, the Nth transmission signal $S_{N-1}$ emerging from the Nth driver cell 200d represents ($B_{N-2} - B_{N-1}$). In the case where $B_{N-2} - B_{N-1}$ equals 1 the resulting transmission signal $S_{N-1}$ equals "+1". In the case where $B_{N-2} - B_{N-1}$ equals −1, the resulting transmission signal $S_{N-1}$ equals "−1". In the case where $B_{N-2} - B_{N-1}$ equals 0, the resulting transmission signal $S_{N-1}$ is reference "0(Z)". Each of the data lines 115a, 115b, 115c, 115d, and 115e is coupled to two driver cells, one input each. For example, the (N−1)th data line 115d over which $B_{N-2}$ is being transmitted is coupled to a second input 202c of the (N−1)th driver cell 200c and also to a first input 201d of the Nth driver cell 200d. As a result, in this embodiment, each driver cell except for the first 200a and (N+1)th 200e driver cells of the driver 120 is coupled to two encoded data lines.

Figure 7:
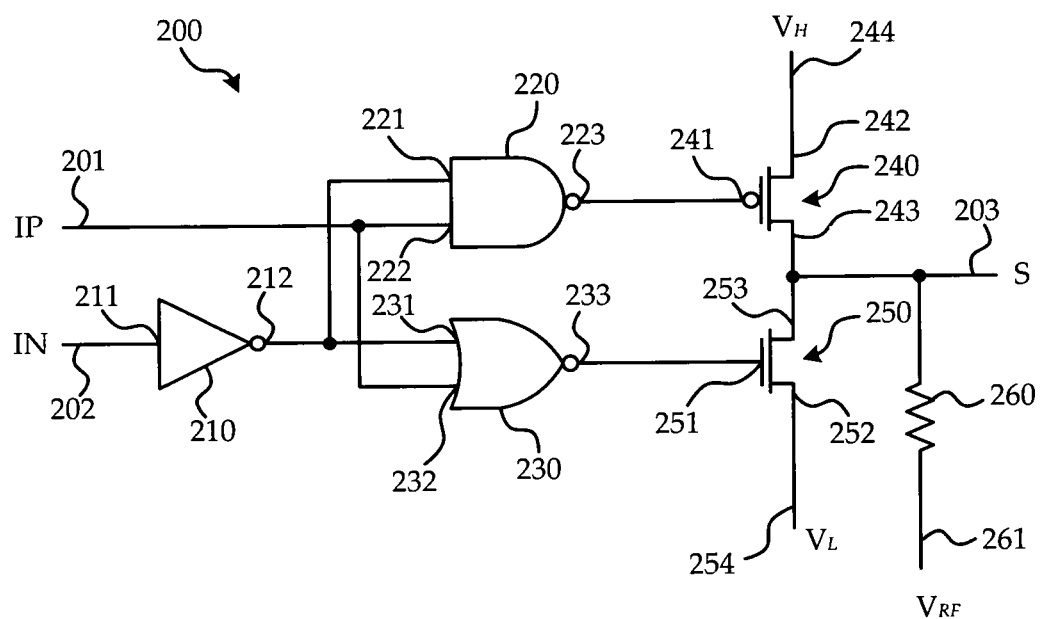
FIG. 7 is a schematic diagram illustrating a single driver cell of the driver according to the embodiment illustrated in FIGS. 1 and 6.

Reference is also now made to FIG. 7 depicting an example driver cell, generally indicated by 200 in FIG. 7. The driver cell 200 has an inverter 210, a NAND gate 220, a NOR gate 230, p-FET (p-type Field Effect Transistor) 240, n-FET (n-type Field Effect Transistor) 250, and a resistor 260, which are coupled to provide the 3-level output signal S output over an output 203 of the driver cell 200 depending on the input signals IP (input positive, indicated by "+" in FIG. 6) and IN (input negative, indicated by "−" in FIG. 6) being input over a first input 201 of the driver cell and a second input 202 of the driver cell 200 respectively.

The structure of the example driver cell 200 will now be described. The second input 202 of the driver cell 200 is coupled to an input 211 of the inverter 210. An output 212 of the inverter is coupled to a first input 221 of the NAND gate 220 and a first input 231 of the NOR gate 230. The first input 201 of the driver cell 200 is coupled to a second input 222 of the NAND gate 220 and a second input 232 of the NOR gate 230. An output 223 of the NAND gate 220 is coupled to a gate input 241 of the p-FET 240, while an output 233 of the NOR gate 230 is coupled to a gate input 251 of the n-FET 250. A source 252 of the n-FET 250 is coupled to a low voltage $V_L$ 254 while a drain 253 of the n-FET 250 is coupled to an output 203 of the driver cell 200 from which the signal S is output. A source 242 of the p-FET 240 is coupled to a high voltage $V_H$ 244 while a drain 243 of the p-FET 240 is coupled to the output 203 of the driver cell 200. The output 203 of the driver cell 200 is coupled across the resistor 260 to the reference voltage $V_{RF}$ 261. The reference voltage $V_{RF}$, low voltage $V_L$, and high voltage $V_H$ are preferably such that $V_L < V_{RF} < V_H$ and $V_H - V_{RF} = V_{RF} - V_L$.

In terms of function, when both signals IP and IN input over the first 201 and second inputs 202 have a logical value of 1, the logical value emerging from the inverter 210 is 0 and hence the logical values input to both the NAND gate 220 and the NOR gate 230 are 1 and 0. When input with a 1 and 0, the NAND gate 220 outputs a 1 and the NOR gate 230 outputs a 0. A 1 arriving at the gate input 241 of the p-FET 240 turns off the p-FET 240 to cause an open circuit condition between its source 242 and its drain 243. A 0 arriving at the gate input 251 of the n-FET 250 turns off the n-FET to cause an open circuit condition between its source 252 and its drain 253. This causes the signal S output from the output 203 of the driver cell 200 to be a reference signal "0(Z)" or $V_{RF}$. The resistor 260 is used for transmission impedance matching.

In the case where both signals IP and IN being input over the first 201 and second 202 inputs have a logical value of 0, the logical value emerging from the inverter 210 is 1 and as above the NAND gate 220 and the NOR gate 230 each receive a 1 and a 0. Similar to the case described above this causes an open circuit condition across the p-FET 240 and also the n-FET 250 resulting in the signal S emerging from output 203 of the driver cell 200 to be a reference signal "0(Z)".

In the case where signal IP input over the first input 201 has a logical value of 1, and the signal IN input over the second input 202 has a logical value of 0, the logical value emerging from the inverter 210 is 1. In this case both the NAND gate 220 and the NOR gate 230 each receive two 1s. The logical value emerging from the NAND gate 220 is 0, and the logical value emerging from the NOR gate 230 is also 0. A 0 arriving at the gate input 241 of the p-FET 240 causes a closed circuit condition between its source 242 and its drain 243. A 0 arriving at the gate input 251 of the n-FET 250 turns off the n-FET 250 to cause an open circuit condition between its source 252 and its drain 253. This causes the signal S emerging from the output 203 of the driver cell 200 to be at $V_H$ which is the high level signal "+1".

In the case where the signal IP input over the first input 201 has a logical value of 0, and the signal IN input over the second input 202 has a logical value of 1, the logical value emerging from the inverter 210 is 0. In this case both the NAND gate 220 and the NOR gate 230 each receive two 0s. The logical value emerging from the NAND gate 220 is 1, and the logical value emerging from the NOR gate 230 is also 1. A 1 arriving at the gate input 241 of the p-FET 240 causes an open circuit condition between its source 242 and its drain 243. A 1 arriving at the gate input 251 of the n-FET 250 turns on the n-FET 250 to cause a closed circuit condition between its source 252 and its drain 253. This causes the signal S output from the output 203 of the driver cell 200 to be at $V_L$ which is the low level signal "−1"

Table I is a truth table summarizing the above results of the values of the output signal S as a function of input signals IP and IN. When IP and IN are both 0 or are both 1, the output signal S is a reference "0(Z)" signal. However, when IP=0 and IN=1, S="−1" and when IP=1 and IN=0 S="+1".

TABLE I

Truth table for output S of driver cell of FIG. 7.

| IP | IN | S |
|----|----|----|
| 0 | 0 | "0(Z)" |
| 0 | 1 | "−1" |
| 1 | 0 | "+1" |
| 1 | 1 | "0(Z)" |

Referring once again to FIG. 6, each one of the driver cells 200a, 200b, 200c, 200d, and 200e produces the respective output signal $S_0, S_1, \ldots, S_{N-2}, S_{N-1}$, and $S_N$ and transmits it from a respective output 203a, 203b, 203c, 203d, and 203e and over a respective one of N+1 transmission lines 125a, 125b, 125c, 125d, and 125e, of which only five, the first 125a, second 125b, (N−2)th 125c, (N−1)th 125d, and Nth 125e are shown for convenience.

The receiver 130 has N receiver cells ($RX_0, \ldots, RX_{N-1}$). Only five receiver cells, the first 300a, second 300b, (N−2)th 300c, (N−1)th 300d, and Nth 300e are shown for convenience. The receiver 130 also has N restore cells ($R_0, \ldots, R_{N-1}$) of which only five restore cells, the first 400a, second 400b, (N−2)th 400c, (N−1)th 400d, and Nth 400e are shown. Each receiver cell is coupled to two transmission lines. For example the (N−1)th receiver cell 300d is coupled to the (N−1)th transmission line 125c and the Nth transmission line 125d. Each of the transmission lines 125a, 125b, 125c, 125d, and 125e is coupled to an input of one receiver cell and is also coupled to an input of another receiver cell. For example, the (N−1)th transmission line 125c over which $S_{N-2}$ is being transmitted is coupled to a second input 302c of the (N−2)th receiver cell 300c and also to a first input 301d of the (N−1)th receiver cell 300d. The first 200a, the (N+1)th 200e driver cells and the first 400a and Nth 400e restore cells are each coupled to a digital voltage $V_d$. In other embodiments these digital voltages are not the same, for example a first digital voltage $V_0$ (1 or 0) could be coupled to the first driver cell 200a and the first restore cell 400a while a second digital voltage $V_1$ (0 or 1) could be coupled to the (N+1)th driver cell 200e and the Nth restore cell 400e.

Figure 8:
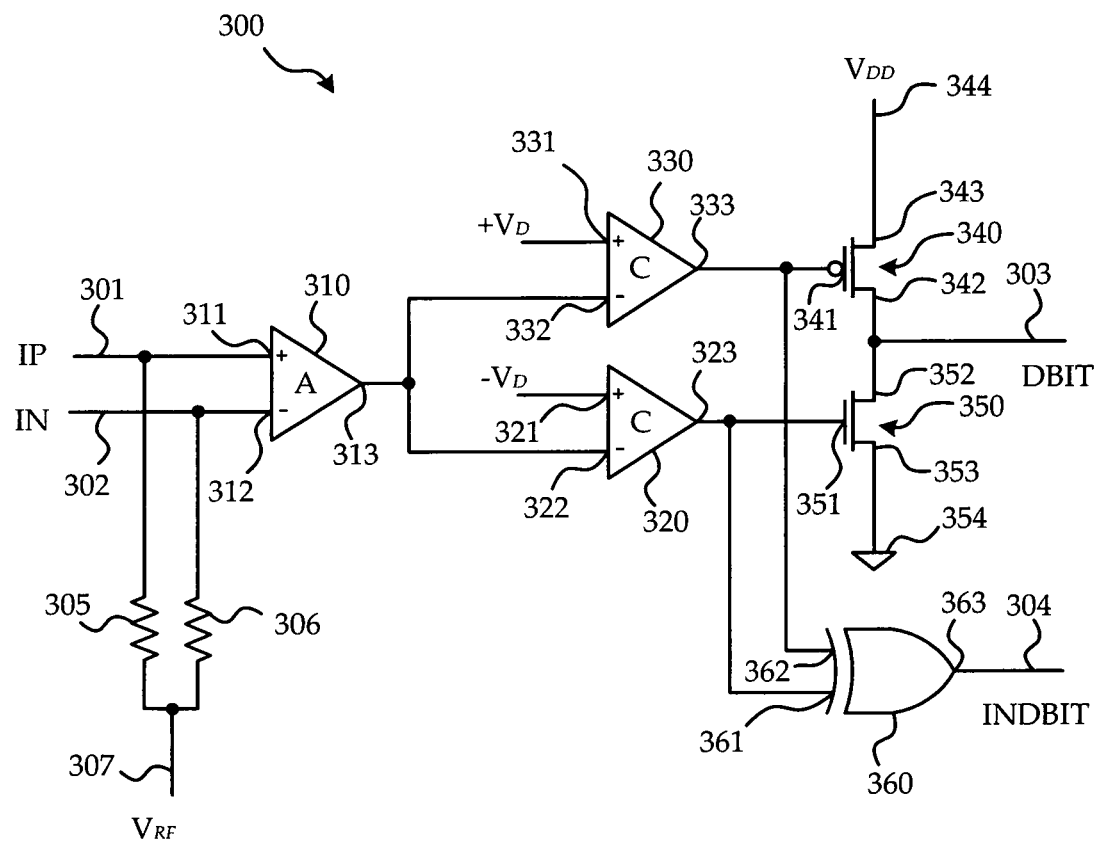
FIG. 8 is a schematic diagram illustrating a single receiver cell of the receiver according to the embodiment illustrated in FIGS. 1 and 6.

Reference is also now made to FIG. 8 depicting an example receiver cell, generally indicated by 300 in FIG. 8. The receiver cell 300 has an amplifier 310 with a gain of unity, a positively referenced comparator 330, a negatively referenced comparator 320, a p-FET (p-type Field Effect Transistor) 340, an n-FET (n-type Field Effect Transistor) 350, an XOR gate 360, a first resistor 305, and a second resistor 306, which are coupled to provide a direct bit (DBIT) signal over a direct output 303 of the receiver cell 300 and to provide an indirect bit (INDBIT) signal over an indirect output 304 of the receiver cell. The values of the DBIT and INDBIT signals depend on the input signals IP (input positive, indicated by "+" in FIG. 6) and IN (input negative, indicated by "−" in FIG. 6) being input over a first input 301 of the receiver cell 300 and a second input 302 of the receiver cell 300 respectively.

The structure of the example receiver cell 300 will now be described. The first input 301 of the receiver cell 300 is coupled to a first input 311 of the amplifier 310, and is coupled across the first resistor 305 to a reference voltage $V_{RF}$ 307. The second input 302 of the receiver cell 300 is coupled to a second input 312 of the amplifier 310, and is coupled across the second resistor 306 to the reference voltage $V_{RF}$ 307. The output 313 of the amplifier 310 is coupled to a second input 332 of the positively referenced comparator 330 and to a second input 322 of the negatively referenced comparator 320. A first input 331 of the positively referenced comparator 330 is coupled to a positive voltage $+V_D$, while a first input 321 of the negatively referenced comparator 320 is coupled to a negative voltage $-V_D$. The value of $V_D$ preferably is equal to half of $V_H$–$V_{RF}$. Each comparator 320, 330 generates a 1 when the signal received over its first input 321, 331 is greater than the signal received over its second input 322, 332, and generates a 0 when the signal received over its first input 321, 331 is not greater than the signal received over its second input 322, 332. An output 333 of the positively referenced comparator 330 is coupled to a gate input 341 of the p-FET 340, and also to a first input 362 of the XOR gate 360. An output 323 of the negatively referenced comparator 320 is coupled to a gate input 351 of the n-FET 350, and also to a second input 361 of the XOR gate 360. A source 343 of the p-FET 340 is coupled to a power voltage $V_{DD}$ 344, while a drain 342 of the p-FET 340 is coupled to the direct output 303 of the receiver cell 300. The power voltage $V_{DD}$ is of a magnitude used to represent a digital 1. A source 353 of the n-FET 350 is coupled to a digital ground 354 whose voltage represents a digital 0, while a drain 352 of the n-FET 350 is coupled to the direct output 303. An output 363 of the XOR gate 360 is coupled to the indirect bit output 304 of the receiver cell 300.

In terms of function, the amplifier 310 outputs a signal over its output 313 which has a value of the first input 311 minus the second input 312. In the arrangement depicted in FIG. 6, each pair of neighboring driver cells share a single encoded input $B_j$. Since there are only two possible values for the input signals $B_j$, namely 0 and 1, and since neighboring driver cells of FIG. 6 share one input, neighboring driver cells cannot both generate a direct output of "+1" or "−1". As such the possible input signal pairs [IP, IN] for any receiver cell are ["+1","−1"], ["−1","+1"], ["0(Z)","+1"], ["0(Z)","−1"], ["+1","0(Z)"], ["−1","0(Z)"], and ["0(Z)","0(Z)"].

In the case where the input signal IP is "+1" and IN is "−1", the signal emerging from the output 313 of the amplifier 310 is "+2". This "+2" is greater than $V_D$ and hence the output of the positively referenced comparator 330 is 0. The output of the negatively referenced comparator 320 is also 0. When input with two 0s, the XOR gate 360 generates a 0 which emerges as the INDBIT signal from the indirect output 304 of the receiver cell 300. When the gate input 341 of the p-FET 340 equals 0, the p-FET 340 is turned on. When the gate input 351 of the n-FET 350 equals 0, the n-FET 350 is turned off. Since the p-FET 340 is turned on, it provides a connection to $V_{DD}$ and the resulting DBIT signal output over the direct output 303 of the receiver cell 300 is equal to 1.

In the case where the input signal IP is "−1" and IN is "+1", the signal emerging from the output 313 of the amplifier 310 is "−2". The output of the positively referenced comparator 330 is 1. Since $-V_D$ is greater than "−2", the output of the negatively referenced comparator 320 is also 1. When input with two 1s, the XOR gate 360 generates a 0 which emerges as the INDBIT signal from the indirect output 304 of the receiver cell 300. When the gate input 341 of the p-FET 340 equals 1, the p-FET 340 is turned off. When the gate input 351 of the n-FET 350 equals 1, the n-FET 350 is turned on. Since the n-FET 350 is turned on a connection to the digital ground is provided and the resulting DBIT signal output over the direct output 303 of the receiver cell 300 is equal to 0.

In the case where the input signal IP is "0(Z)" and IN is "+1", the signal emerging from the output 313 of the amplifier 310 is "−1". The output of the positively referenced comparator 330 is "1". Since $-V_D$ is greater than "−1", the output of the negatively referenced comparator 320 is also 1. When input with two 1s, the XOR gate 360 generates a 0 which emerges as the INDBIT signal from the indirect output 304 of the receiver cell 300. When the gate input 341 of the p-FET 340 equals 1, the p-FET 340 is turned off. When the gate input 351 of the n-FET 350 equals 1, the n-FET 350 is turned on. Since the n-FET 350 is turned on a connection is made to the digital ground and the resulting DBIT signal output over the direct output 303 of the receiver cell 300 is equal to 0.

In the case where the input signal IP is "0(Z)" and IN is "−1", the signal emerging from the output 313 of the amplifier 310 is "+1". Since "+1" is greater than $V_D$, the output of the positively referenced comparator 330 is 0. The output of the negatively referenced comparator 320 is 0. When input with two 0s, the XOR gate 360 generates a 0 which emerges as the INDBIT signal from the indirect output 304 of the receiver cell 300. When the gate input 341 of the p-FET 340 equals 0, the p-FET 340 is turned on. When the gate input 351 of the n-FET 350 equals 0, the n-FET 350 is turned off. Since the p-FET 340 is turned on a connection is made to the power voltage $V_{DD}$ 344 and the resulting DBIT signal output over the direct output 303 of the receiver cell 300 is equal to 1.

In the case where the input signal IP is "+1" and IN is "0(Z)", the signal emerging from the output 313 of the amplifier 310 is "+1". Since $V_D$ is less than "+1", the output of the positively referenced comparator 330 is 0. The output of the negatively referenced comparator 320 is 0. When input with two 0s, the XOR gate 360 generates a 0 which emerges as the INDBIT signal from the indirect output 304 of the receiver cell 300. When the gate input 341 of the p-FET 340 equals 0, the p-FET 340 is turned on. When the gate input 351 of the n-FET 350 equals 0, the n-FET 350 is turned off. Since the p-FET 340 is turned on a connection is made to the power voltage $V_{DD}$ 354 and the resulting DBIT signal output over the direct output 303 of the receiver cell 300 is equal to 1.

In the case where the input signal IP is "−1" and IN is "0(Z)", the signal emerging from the output 313 of the amplifier 310 is "−1". The output of the positively referenced comparator 330 is 1. Since $-V_D$ is greater than "−1", the output of the negatively referenced comparator 320 is also 1. When input with two 1s, the XOR gate 360 generates a 0 which emerges as the INDBIT signal from the indirect output 304 of the receiver cell 300. When the gate input 341 of the p-FET 340 equals 1, the p-FET 340 is turned off. When the gate input 351 of the n-FET 350 equals 1, the n-FET 350 is turned on. Since the n-FET 350 is turned on a connection to the digital ground is made and the resulting DBIT signal output over the direct output 303 of the receiver cell 300 is equal to 0.

In the case where the input signal IP is "0(Z)" and IN is "0(Z)", the signal emerging from the output 313 of the amplifier 310 is "0". Since $+V_D$>"0", the output of the positively referenced comparator 330 is 1. Since $-V_D$<"0", the output of the negatively referenced comparator 320 is 0. When input with a 1 and a 0, the XOR gate 360 generates a 1 which emerges as the INDBIT signal from the indirect output 304 of the receiver cell 300. When the gate input 341 of the p-FET 340 equals 1, the p-FET 340 is turned off. When the gate input 351 of the n-FET 350 equals 0, the n-FET 350 is turned off. Since the p-FET 340 and the n-FET 350 are both turned off there is an open circuit condition to the direct output 303, and the resulting DBIT signal output over the direct output 303 of the receiver cell 300 is at a high impedance or which is also referred to as "HZ".

Truth Table II below provides a summary of the above results, listing values of output signals DBIT and INDBIT as a function of inputs signals IP and IN.

TABLE II

Listing of values of outputs DBIT, INDBIT as a function of possible inputs IP and IN.

| IP | IN | DBIT | INDBIT |
|---|---|---|---|
| "+1" | "0(Z)" | 1 | 0 |
| "+1" | "−1" | 1 | 0 |
| "0(Z)" | "+1" | 0 | 0 |
| "0(Z)" | "0(Z)" | "HZ" | 1 |
| "0(Z)" | "−1" | 1 | 0 |
| "−1" | "+1" | 0 | 0 |
| "−1" | "0(Z)" | 0 | 0 |

Referring once again to FIG. 6, each restore cell is coupled to a respective receiver cell by a direct connection line and an indirect connection line. For example the direct output 303*d* of the (N−1)th receiver cell 300*d* is coupled to a direct input 401*d* of the (N−1)th restore cell 400*d* by a connection line 388*d*, while the indirect output 304*d* of the (N−1)th receiver cell 300*d* is coupled to an indirect input 402*d* of the (N−1)th restore cell 400*d* by a connection line 399*d*.

Figure 9:
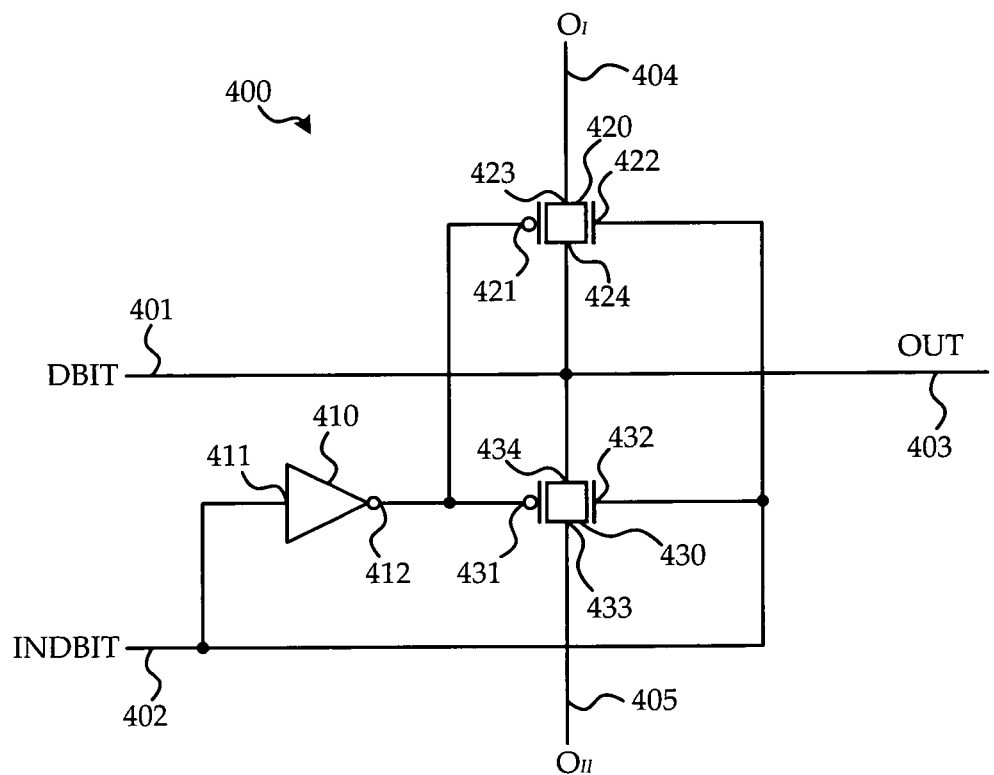
FIG. 9 is a schematic diagram illustrating a single recover cell of the receiver according to the embodiment illustrated in FIGS. 1 and 6.

Reference is also now made to FIG. 9 depicting an example restore cell, generally indicated by 400 in FIG. 8. The restore cell 400 has an inverter 410, a first pass gate 420, and a second pass gate 430 which are coupled to provide an output signal OUT over an output 403 of the restore cell 400. The value of the output signal OUT depends on the direct bit DBIT signal and the indirect bit INDBIT signal being input over the direct input 401 and the indirect input 402 of the restore cell 400 respectively.

The structure of the example restore cell 400 will now be described. The direct input 401 of the restore cell 400 is coupled to the output 403 of the restore cell 400, a first terminal 424 of the first pass gate 420, and a first terminal 434 of the second pass gate 430. The indirect input 402 is coupled to an input 411 of the inverter 410, an n-FET gate 422 of the first pass gate 420, and an n-FET gate 432 of the second pass gate 430. An output 412 of the inverter 410 is coupled to a p-FET gate 421 of the first pass gate 420 and a p-FET gate 431 of the second pass gate 430. A second terminal 423 of the first pass gate 420 is coupled to a first neighbor terminal 404 of the restore cell 400. A second terminal 433 of the second pass gate 430 is coupled to a second neighbor terminal 405 of the restore cell 400. The first neighbor terminal 404 of a restore cell 400 is coupled to an output of a first neighbor restore cell, while the second neighbor terminal 405 of the restore cell is coupled to an output of a second neighbor restore cell. For example, with reference to FIG. 6, the first neighbor terminal 404d of the (N−1)th restore cell 400d is coupled to the output 403c of the (N−2)th restore cell 400c by a second neighbor output line 499c of the (N−2)th restore cell 400c. The second neighbor terminal 405d of the (N−1)th restore cell 400d is coupled to the output 403e of the Nth restore cell 400e by a first neighbor output line 488e of the Nth restore cell 400e. In turn, the (N−1)th restore cell 400d has its output 403d connected to a first neighbor terminal 404e of the Nth restore cell 400e by a second neighbor output line 499d of the (N−1)th restore cell 400d. The (N−1)th restore cell 400d also has its output 403d connected to a second neighbor terminal 405c of the (N−2)th restore cell 400c by a first neighbor output line 488d of the (N−1)th restore cell 400d. It should be noted that in this embodiment the first restore cell receives over its first neighbor input the digital voltage $V_d$, and the (N+1)th restore cell receives over its second neighbor input the digital voltage $V_d$.

The example restore cell 400 of FIG. 9 will now be described in terms of its function. As described above there are three possible combinations of direct bit signal and indirect bit signal pairs [DBIT, INDBIT] arriving at the direct input 401 and indirect input 402 of the restore cell 400, namely, [1, 0],["HZ", 1], and [0, 0].

In any case where the indirect bit signal INDBIT input over indirect input 402 equals 0, the inverter 410 outputs a logical 1. Each of the first pass gate 420 and the second pass gate 430 will receive a logical 1 at its respective p-FET gate 421, 431 and also will receive a logical 0 at its respective n-FET gate 422, 432. As a result the first pass gate 420 and the second pass gate 430 are both turned off. The resulting output signal OUT output over the output 403 of the restore cell 400 will therefore equal the value of the direct bit signal DBIT input over the direct input 401 of the restore cell 400. Hence the aforementioned pair of signal values [1, 0] will result in an output signal of 1, while the aforementioned pair of signal values [0, 0] will result in an output signal of 0.

In the case where the indirect bit signal INDBIT input over the indirect input 402 equals 1, the inverter 410 outputs a logical 0. Each of the first pass gate 420 and the second pass gate 430 will receive a 0 at its respective p-FET gate 421, 431 and also will receive a 1 at its respective n-FET gate 422, 432. As a result the first pass gate 420 and the second pass gate 430 are both turned on. The resulting output signal OUT output over the output 403 of the restore cell 400 will therefore equal the value of a first neighbor signal $O_I$ at the first neighbor terminal 404 and a second neighbor signal $O_{II}$ at the second neighbor terminal 405. It should be noted that in a case where output signal of a restore cell originates from its neighbors, no signal will be output until one has been received over either the first 404 or the second neighbor terminal 405.

As was shown above, an indirect bit signal INDBIT equals 1 only when the receiver cell generating it is itself receiving two input signals equaling "0(Z)" from neighboring driver cells. The only case where a driver cell generates a "0(Z)" signal is when both signals input to the driver cell are equal. As was also shown above, neighbor driver cells share one input signal. Hence for an indirect bit signal INDBIT of 1 to emerge from a receiver cell, all four inputs of the neighboring driver cells transmitting to that receiver cell, are receiving the same signal. This in turn means that the three input signals $B_{i-1}$, $B_i$, $B_{i+1}$ which are coupled to those four driver cell inputs are the same. In other words are three contiguous input signals $B_{i-1}$, $B_i$, $B_{i+1}$ having the same value. Each of the two driver cells has a nearest neighbor driver cell each receiving one of the three signals for a total of four driver cells. There are five input signals $B_{i-2}$, $B_{i-1}$, $B_i$, $B_{i+1}$, $B_{i+2}$, coupled to those four driver cells and as discussed above the three input signals $B_{i-1}$, $B_i$, $B_{i+1}$ are known to be the same for this case. In one particular case the input signals $B_{i-2}$, $B_{i+2}$ are different than the three input signals $B_{i-1}$, $B_i$, $B_{i+1}$ and since there are only two possible levels (0 or 1) the input signals $B_{i-2}$, $B_{i+2}$ must be the same in this particular case. As such, the values recovered by the neighboring restore cells will equal each other and be of a value which is to be recovered by the restore cell in this particular case. The coupling of the first neighbor terminal 404 and the second neighbor terminal 405 to the output 403 of the restore cell 400 in this case recovers the correct signal value to output over the output 403 of the restore cell 400.

In a case where more than three contiguous input signals $B_i$ are equal, at least two neighboring restore cells will be input with two "0(Z)" signals each, in which case the output signals output by the restore cells will originate from the nearest restore cell which is not input with two "0(Z)" signals which may originate from a restore cell more remote than the neighbor restore cells. If the number of neighboring restore cells which have received an INDBIT of 1 is not small, the time it takes for a restore cell somewhere in the middle to receive a signal in order to output the signal can become a limiting factor in the performance of the bus.

To summarize the above, the Truth Table III below provides a listing of values of the output signal OUT as a function of inputs INDBIT, DBIT.

TABLE III

Listing of output values as a function of inputs INDBIT, DBIT.

| INDBIT | DBIT | OUT |
|--------|------|-----|
| 0 | 0 | 0 |
| 0 | 1 | 1 |
| 1 | "HZ" | $O_I = O_{II}$ |

Referring once again to FIG. 6, the output signals $B_0$, $B_1$, ... $B_{N-1}$ emerging from the N restore cells 400a, 400b, ... 400e and over the N encoded data lines 135a, 135b, ... 135e are the same as the input signals $B_0$, $B_1$, ... $B_{N-1}$ and hence have been recovered as encoded bits and F, the encoded bits of which are to be decoded in the decoder 140 according to the value of F as described above.

Although in the preferred embodiment a particular arrangement of driver and corresponding receive and restore cells has been described, other configurations may be implemented which are also in accordance with the invention. Another embodiment will now be described with reference to FIG. 10A.

Figure 10A:
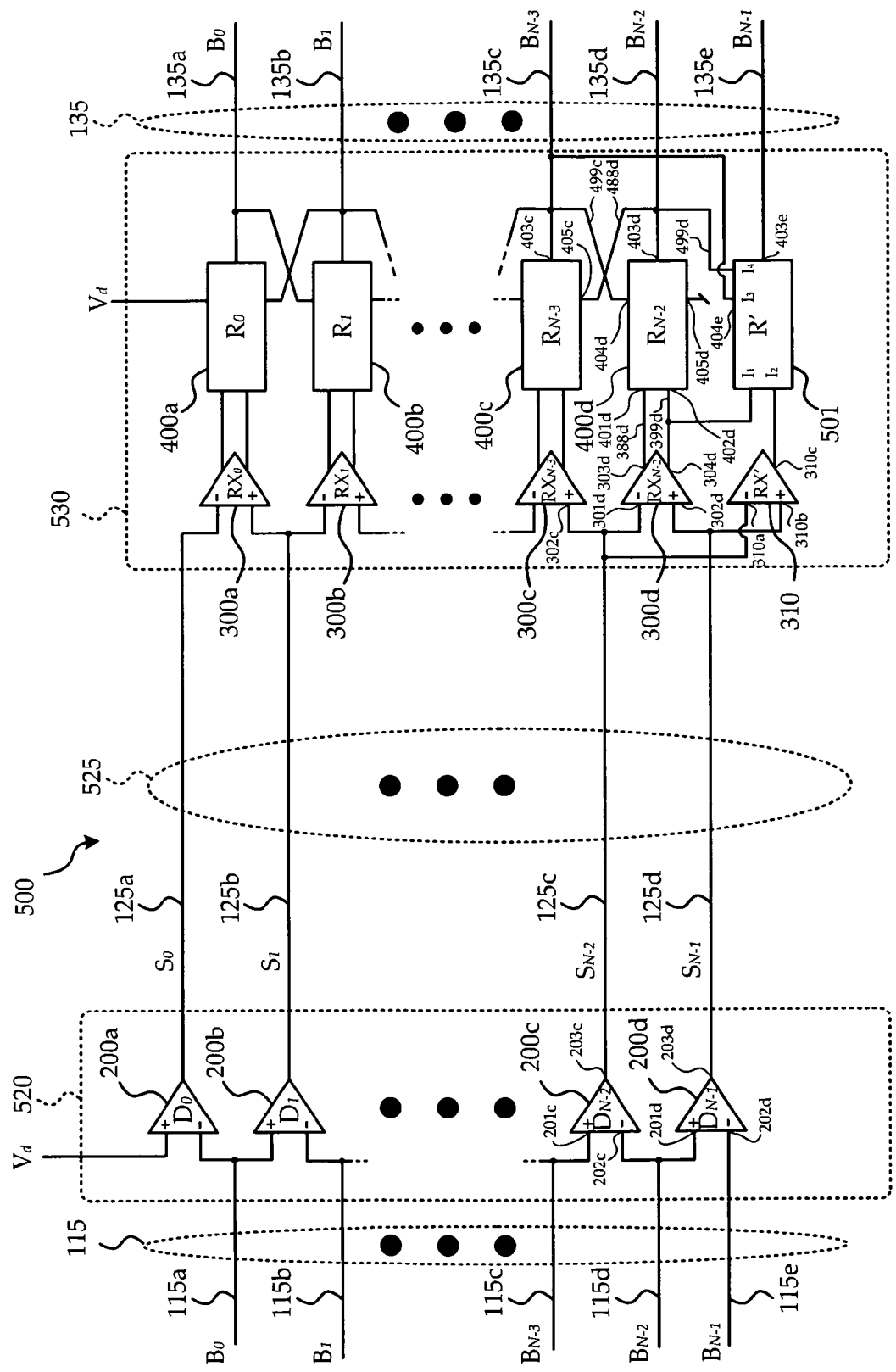
FIG. 10A is a schematic diagram illustrating a data transmission system, in accordance with another embodiment of the invention.

Referring to FIG. 10A, shown is a schematic diagram illustrating a data transmission system 500, in accordance with another embodiment of the invention. The data transmission system 500 has a driver 520 and a receiver 530. The driver 520 is similar to the driver 120 of FIG. 6 except that there is no driver cell $D_N$ 200e. In this embodiment, the input signal $B_{N-1}$ is connected to the driver cell 200d. Each one of the driver cells 200a, 200b, 200c, and 200d produces a respective one of the respective output signals $S_0$, $S_1$, ... $S_{N-2}$, and $S_{N-1}$, and transmits it from a respective output 203a, 203b, 203c, and 203d and over a respective one of N transmission lines 125a, 125b, 125c, and 125d, of which only four, the first 125a, second 125b, (N−2)th 125c, and (N−1)th 125d are shown for convenience. The receiver 530 is similar to the receiver 130 of FIG. 6 except that the receiver cell $RX_{N-1}$ 300e is replaced with receiver cell RX' 310 and the restore cell $R_{N-1}$ 400e is replaced with restore cell R' 501. Inputs 310a and 310b of the receiver cell RX' 310 are coupled to transmission lines 125c and 125d, respectively. An output 310c of the receiver cell RX' 310 is coupled to an input $I_2$ of the restore cell R' 501. Input $I_1$ is coupled to output 304d of the receiver cell 300d. An input $I_3$ of the restore cell R' 501 is coupled to output 403c of the restore cell $R_{N-3}$ 400c. An input $I_4$ of the restore cell R' 501 is coupled to output 403d of the restore cell $R_{N-2}$ 400d. The restore cell R' 501 also has an output 403e coupled to data line 135e. In this embodiment the data transmission system can achieve k bits over k data lines.

Figure 10B:
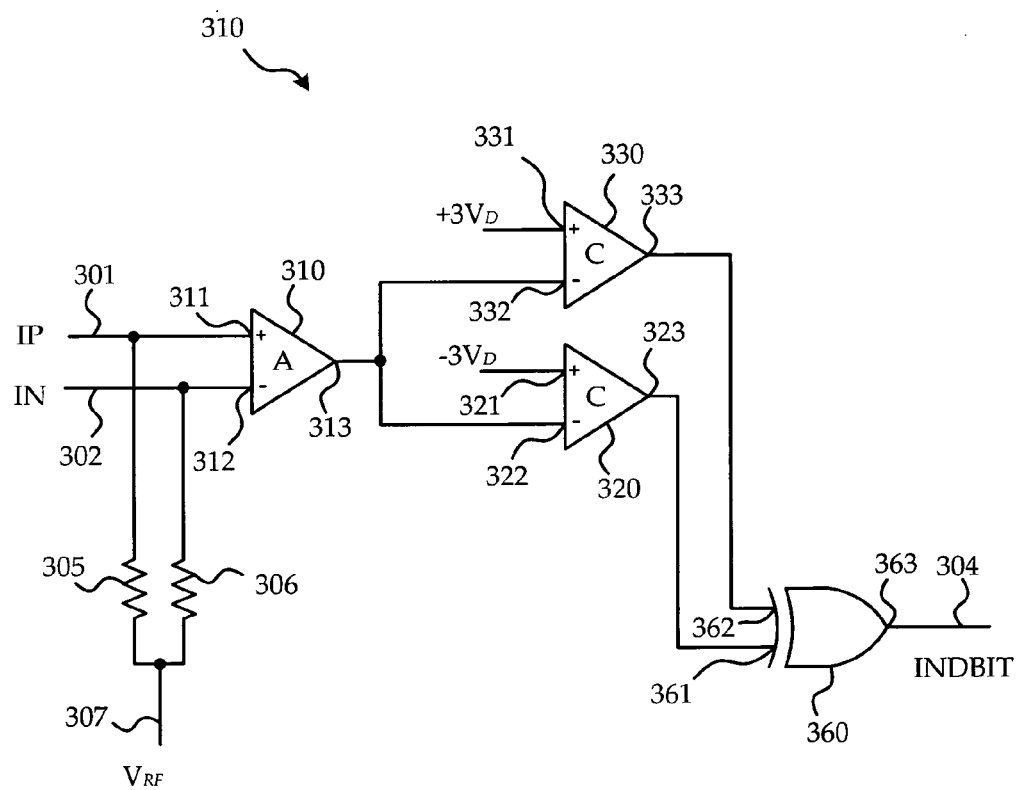
FIG. 10B is a schematic diagram of a restore cell RX' of FIG. 10A.

Reference is now made to FIG. 10B depicting the restore cell RX' 310 of FIG. 10A. The restore cell RX' 310 is similar to the restore cell 300 of FIG. 8 except that the input 331 of the comparator 330 is coupled to $+3V_D$ instead $+V_D$ and the input 321 of the comparator 320 is coupled to $-3V_D$ instead of $-V_D$. Furthermore, there is no p-FET transistor 340, no n-FET transistor 350, and no output 303 for producing DBIT.

The operation of the restore cell RX' 310 is similar to that of the restore cell 300 of FIG. 8 except that coupling of comparators 330 and 320 to $+3V_D$ and $-3V_D$, respectively, results in a different mapping the inputs IP and IN onto INDBIT at the output 304.

To summarize the above operation of the receiver cell RX' 310, the Truth Table IV below provides a listing of values of the output DBIT at the output 304 as a function of inputs IP and IN.

TABLE IV

Listing of output value INDBIT of the receiver cell 310 of FIG. 10A as a function of inputs IP and IN.

| IP | IN | INDBIT |
|---|---|---|
| "0(Z)" | "0(Z)" | 1 |
| "0(Z)" | −1 | 1 |
| −1 | +1 | 0 |
| −1 | "0(Z)" | 1 |
| 1 | "0(Z)" | 1 |
| 1 | −1 | 0 |
| "0(Z)" | 1 | 1 |

Only seven combinations of IP and IN are shown in Table IV, and as will be discussed further below, in the data transmission system 500 of FIG. 10A only those combinations are possible.

Figure 10C:
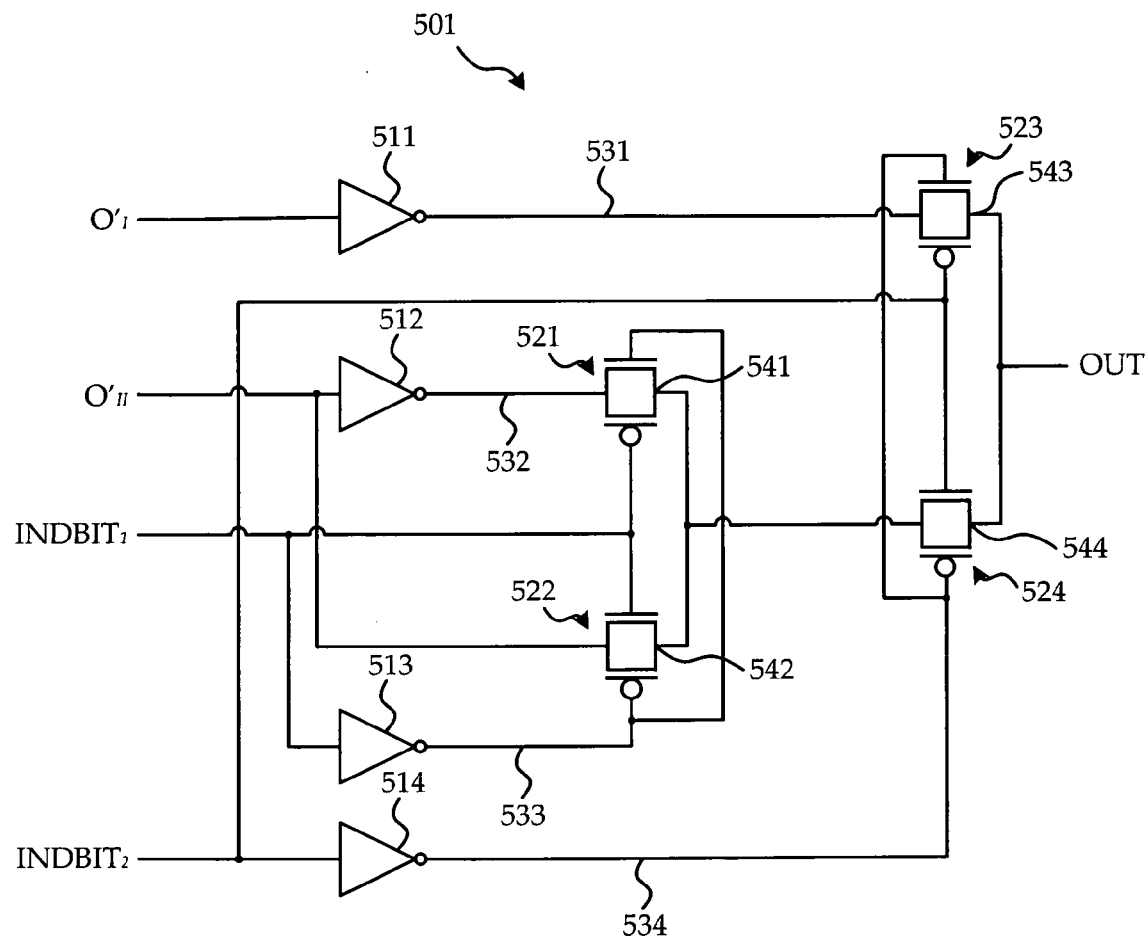
FIG. 10C is a schematic diagram of a restore cell R' of FIG. 10A.

Reference is also now made to FIG. 10C depicting the restore cell R' 501 of FIG. 10A. The restore cell R' 501 has inverters 511, 512, 513, and 514 and pass gates generally indicated by 521, 522, 523, and 524. A signal $O'_I$ corresponding to input $I_4$ of restore cell R' 501 in FIG. 10A is input into the inverter 511 to produce an inverted signal 531 that is input into the pass gate 523. A signal $O'_{II}$ corresponding to input $I_3$ of restore cell R' 501 in FIG. 10A is input into the inverter 512 to produce an inverted signal 532 that is input into the pass gate 521. The signal $O'_{II}$ is also input into pass gate 522. A signal $INDBIT_1$ corresponding input $I_1$ of restore cell R' 501 in FIG. 10A is input into the inverter 513 to produce an inverted signal 533. The signal $INDBIT_1$ and the inverted signal 533 are coupled to the pass gates 521, 522 to turn ON and OFF the pass gates 521, 522. A signal $INDBIT_2$ corresponding to input $I_2$ of restore cell R' 501 in FIG. 10A is input into the inverter 514 to produce an inverted signal 534. The signal $INDBIT_2$ and the inverted signal 534 are coupled to the pass gates 523, 524 to turn ON and OFF the pass gates 523, 524. Outputs 541 and 542 of pass gates 521 and 522, respectively, are coupled together and input into the pass gate 524. Outputs 543 and 544 of pass gates 523 and 524, respectively, are coupled together to produce output signal OUT, which corresponds to output 403e of restore cell R' 501 in FIG. 10A.

The signals $INDBIT_1$ and $INDBIT_2$ are used to collectively turn ON and OFF pass gates 521, 522, 523, 524. When $INDBIT_1$ and $INDBIT_2$ are both zero the pass gates 521 and 523 and turned ON while pass gates 522 and 524 are turned OFF. With pass gate 523 being turned ON the signal $O'_I$ is coupled to the output 543 of pass gate 523 through the inverter 511 to provide the output signal OUT with a value $\overline{O}'_I$ (the complement of $O'_I$). When $INDBIT_1$ equals 0 and $INDBIT_2$ equals 1 the pass gates 521 and 524 and turned ON while pass gates 522 and 523 are turned OFF. With pass gates 521 and 524 being turned ON the signal $O'_{II}$ is coupled to the output 544 of pass gate 524 through the inverter 512 and the pass gates 512 and 524 to provide the output signal OUT with a value $\overline{O}'_{II}$ (the complement of $O'_{II}$). In this example implementation, the case where $INDBIT_1$ equals 1 and $INDBIT_2$ equals 0 does not occur. When $INDBIT_1$ and $INDBIT_2$ are both 1 the pass gates 522 and 524 and turned ON while pass gates 521 and 523 are turned OFF. With pass gates 522 and 524 being turned ON the signal $O'_{II}$ is coupled to the output 544 of pass gate 524 through the pass gates 522 and 524 to provide the output signal OUT with a value $O'_{II}$.

To summarize the above operation of the restore cell R' 501, the Truth Table IV below provides a listing of values of the output OUT as a function of possible combinations of inputs $INDBIT_1$ and $INDBIT_2$.

TABLE V listing of values of the output OUT of the restore cell 501 of FIG. 10C as a function of inputs $INDBIT_1$, $INDBIT_2$, $O'_I$, and $O'_{II}$

| $INDBIT_1$ | $INDBIT_2$ | OUT |
|---|---|---|
| 0 | 0 | $\overline{O}'_I$ |
| 0 | 1 | $\overline{O}'_{II}$ |
| 1 | 1 | $O'_{II}$ |

To summarize the above operation of the receiver cell RX' 310 and the restore cell R' 501 used in the data transmission system 500 of FIG. 10A, the Truth Table VI below provides a listing of values of the output signal $B_{N-1}$ at recovered data line 135e as a function of inputs $B_{N-3}$, $B_{N-2}$, and $B_{N-1}$ at input data lines 115c, 115d, and 115e, respectively.

TABLE VI

Listing of output value OUT of the restore cell R' 501 of FIG. 10C as a function of inputs $B_{N-3}$, $B_{N-2}$, and $B_{N-1}$.

| Input Data Lines | | | Data Transmission Lines | | $RX_{N-2}$ | R' | Recovered Data Line |
|---|---|---|---|---|---|---|---|
| $B_{N-3}$ | $B_{N-2}$ | $B_{N-1}$ | $S_{N-2}$ | $S_{N-1}$ | INDBIT | INDBIT | $B_{N-1}$ |
| 0 | 0 | 0 | 0(Z) | 0(Z) | 1 | 1 | 0 |
| 0 | 0 | 1 | 0(Z) | −1 | 0 | 1 | 1 |
| 0 | 1 | 0 | −1 | 1 | 0 | 0 | 0 |
| 0 | 1 | 1 | −1 | 0(Z) | 0 | 1 | 1 |
| 1 | 0 | 0 | 1 | 0(Z) | 0 | 1 | 0 |
| 1 | 0 | 1 | 1 | −1 | 0 | 0 | 1 |
| 1 | 1 | 0 | 0(Z) | 1 | 0 | 1 | 0 |
| 1 | 1 | 1 | 0(Z) | 0(Z) | 1 | 1 | 1 |

With reference to FIG. 10A, the first three column of Table VI shows possible combinations of values of inputs $B_{N-3}$, $B_{N-2}$, and $B_{N-1}$ at input data lines 115c, 115d, and 115e, respectively. The fourth column of Table VI shows the state of $S_{N-2}$ on the data transmission line 125c as a function of the inputs $B_{N-3}$ and $B_{N-2}$. The fifth column of Table VI shows the state of $S_{N-1}$ on the data transmission line 125d as a function of the inputs $B_{N-2}$ and $B_{N-1}$. The sixth column of Table VI shows the value of INDBIT at the output 304d of the receiver cell $RX_{N-2}$ of FIGS. 10A and 10B as a function of the state of $S_{N-2}$ and $S_{N-1}$. The seventh column of Table VI shows the value of INDBIT at the output 310c of the receiver cell RX' 310 of FIGS. 10A and 10B as a function of the state of $S_{N-2}$ and $S_{N-1}$. The eight column of Table VI shows the values of $B_{N-1}$ at the recovered data line 135e as a function of values of DBIT from the receiver cell $RX_{N-2}$ and the receiver cell RX' 310, the input $I_4$ of the restore cell R' 501 in FIG. 10A, which corresponds to the input $O'_I$ of the receiver cell 501 in FIG. 10C, and the input $I_3$ of the restore cell R' 501 in FIG. 10A, which corresponds to the input $O'_{II}$ of the receiver cell 501 in FIG. 10C.

As can be seen in Table VI, the input $B_{N-1}$ at the input data line 115e shown in the third column of Table VI is recovered at the recovered data line 135e as shown in the eighth column of Table VI. For example, with reference to Tables VI and FIG. 10A when the values of $B_{N-3}$, $B_{N-2}$, and $B_{N-1}$ at the input data lines 115c, 115d, and 115e, respectively, are all equal to 0, $S_{N-2}$ from the driver cell 200c at the transmission data line 125c is at "0(Z)" and $S_{N-1}$ from the driver cell 200d at the transmission data line 125d is also at "0(Z)". These values of $S_{N-2}$ and $S_{N-1}$ are obtained from Table I, which is a truth table for the driver cells 200c and 200d. In particular, with reference to FIG. 10A, $B_{N-3}$ and $B_{N-2}$ having values of 0 are both input in the driver cell 200c and with reference to Table I this results in $S_{N-2}$ being at "0(Z)" on data transmission line 125c. Similarly, with reference to FIG. 10A, $B_{N-2}$ and $B_{N-1}$ having values 0 are both input in the driver cell 200d and with reference to Table I this results in the $S_{N-1}$ being at "0(Z)" on data transmission line 125d. $S_{N-2}$ and $S_{N-1}$ are both input into the restore cell $RX_{N-2}$ 300d and with reference to Table II this results in DBIT being at a high impedance "HZ" and INDBIT being equal to 1 at the outputs 303d and 304d, respectively, of the restore cell $RX_{N-2}$ 300d. As such, the receiver cell $R_{N-2}$ 400d receives a DBIT at "HZ" and an INDBIT equal to 1 at the inputs 401d and 402d, respectively. With reference to Table III and FIGS. 9 and 10A, the output 403d is coupled to a signal $O_I = O_{II} = B_{N-2} = B_{N-3}$, which is input at input $I_4$ of the restore cell R' 501. In addition, $S_{N-2}$ and $S_{N-1}$ are also both input into the receiver cell RX' 310 and with reference to Table IV this results in INDBIT being equal to 1 at the output 310c of the restore cell RX' 310 for transmission to the restore cell R' 501 at the input $I_2$. As such, with reference to FIG. 10C, in this instance $INDBIT_1=1$, $INDBIT_2=1$, and $O'_{II}=B_{N-3}=0$, and with reference to Table V when $INDBIT_1=INDBIT_2=1$ the input $O'_{II}$, which is equal to 0, is passed to the output OUT. This value is the same as that of $B_{N-1}$ at the input data line 115e of FIG. 10A.

Figure 10D:
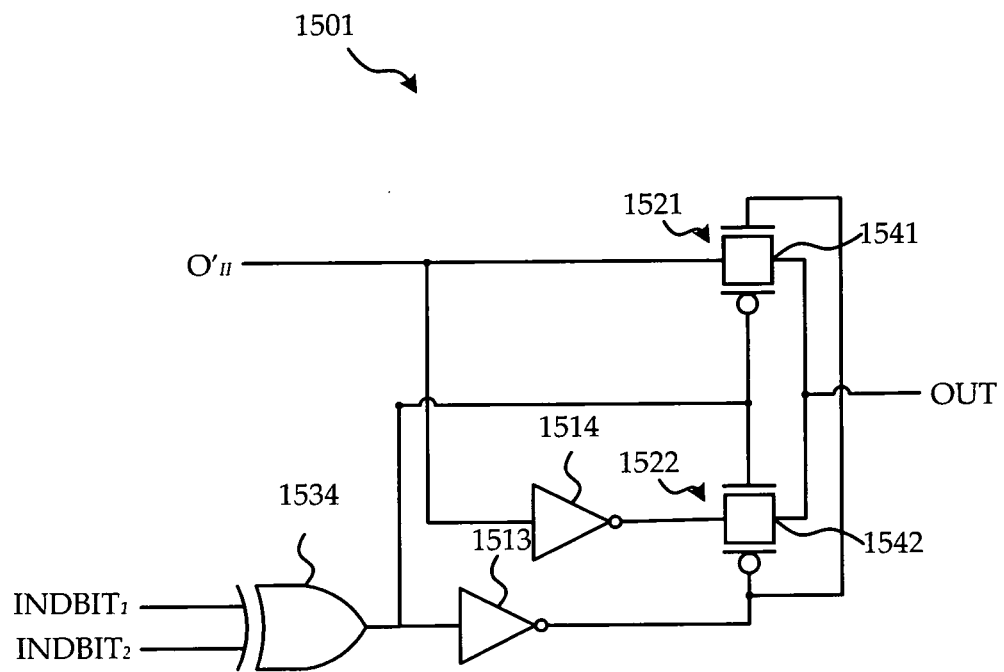
FIG. 10D is a schematic diagram of another restore cell suitable for suitable for functioning as the restore cell R' of FIG. 10A.

The restore cell R' 501 of FIG. 10C provides an example of a restore cell for use in the data transmission system 500 of FIG. 10C. However, other restore cells are possible. Another example restore cell 1501 is shown in FIG. 10D. The restore cell 1501 has an input $O'_{II}$, which corresponds to the input $I_4$ of the restore cell R' 501 of FIG. 10A. However, unlike the restore cell R' of FIG. 10C, there is no input $O'_I$ corresponding to the input $I_3$ of the restore cell R' 501 of FIG. 10A. The restore cell 1501 in FIG. 10D also has inputs $INDBIT_1$ and $INDBIT_2$ corresponding to inputs $I_1$ and $I_2$, respectively, of the restore cell 501 in FIG. 10A. The restore cell R' 1501 has pass gates 1521, 1522 coupled together. The input $O'_{II}$ is input to the pass gate 1521 and input to the pass gate 1522 through inverter 1514. Outputs 1541, 1542 are coupled together to provide an output OUT. The inputs $INDBIT_1$ and $INDBIT_2$ are input to an exclusive-OR gate 1534. The exclusive-OR gate 1534 is coupled both directly to the pass gates 1521, 1522 and indirectly to the pass gates 1521, 1522 through inverter 1513 for turning ON and OFF the pass gates 1521, 1522. Similarly, to the restore cell 501 of FIG. 10C, the inputs $O'_{II}$, $INDBIT_1$, and $INDBIT_2$ are used to recover the data bit $B_{N-1}$. However, in this case there is no input $O'_I$.

Figure 11:
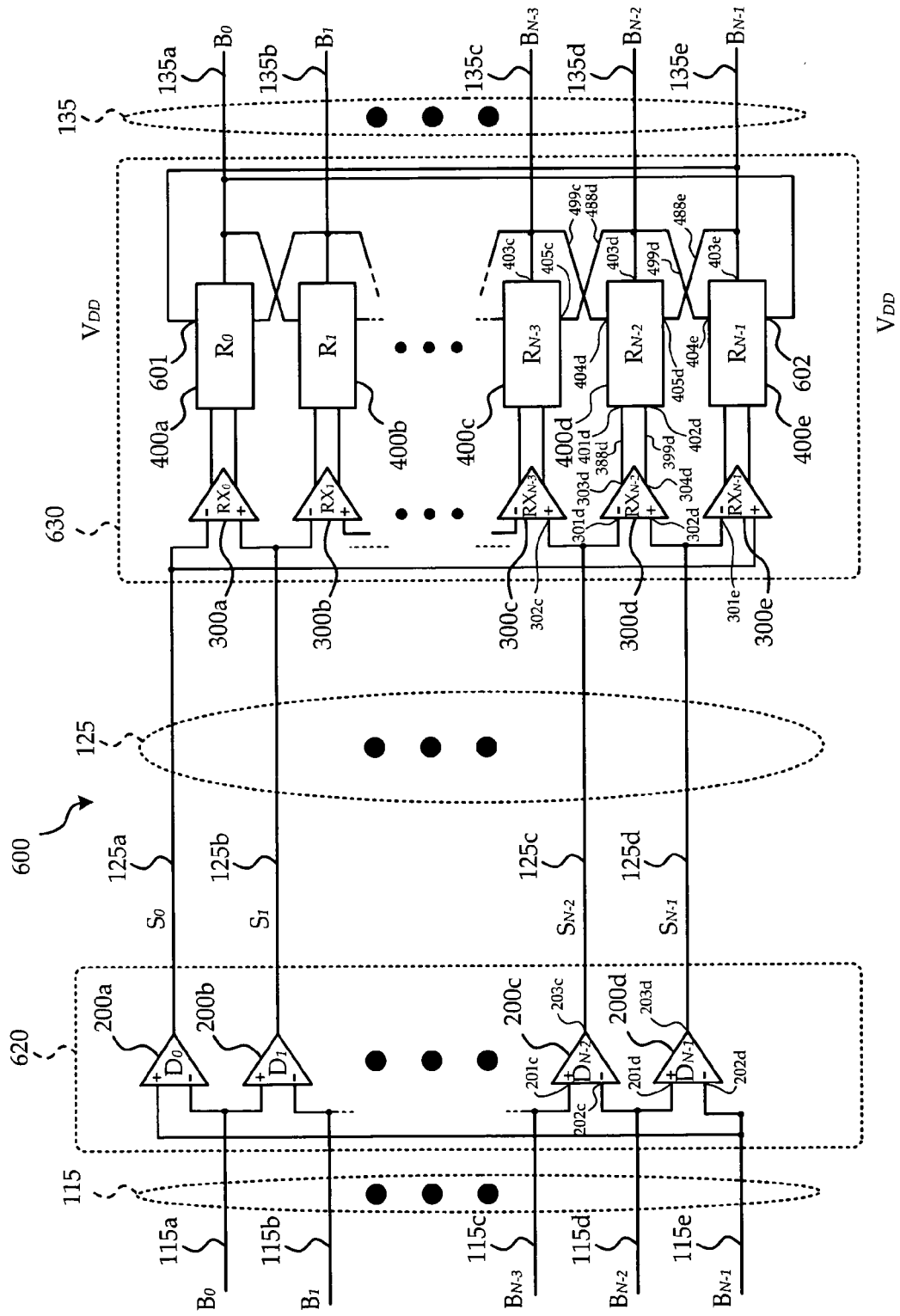
FIG. 11 is a schematic diagram of a data transmission system, in accordance with another embodiment of the invention.

Referring to FIG. 11, shown is a schematic diagram illustrating a data transmission system 600, in accordance with another embodiment of the invention. The data transmission system 600 has a driver 620 and a receiver 630. The driver 620 is similar to the driver 120 of FIG. 6 except that there is no driver cell $D_N$ 200e. In this embodiment, the input signal $B_{N-1}$ is coupled to the driver cells 200a and 200d. Each one of the driver cells 200a, 200b, 200c, and 200d produces a respective one of the output signals $S_0$, $S_1$, ... $S_{N-2}$, and $S_{N-1}$, and transmits it from a respective output 203a, 203b, 203c, and 203d and over a respective one of N transmission lines 125, of which only four, the first 125a, second 125b, (N−1)th 125c, and Nth 125d are shown for convenience. The receiver 530 is similar to the receiver 130 of FIG. 6 except that the restores cells 400a and 400e are coupled to each other at 601 and 602, respectively, instead of $V_d$.

In this embodiment the output signals $B_0$, $B_1$, ... $B_{N-1}$ emerging from the N restore cells 400a, 400b, ..., 400c, 400d, 400e are the same as the input signals $B_0$, $B_1$, ... $B_{N-1}$ except for two cases. If the input signals $B_0$, $B_1$, ... $B_{N-1}$ all have a value of 1 or if all have a value of 0 there would be a conflict or ambiguity since all of the restore cells 400a, 400b, ..., 400c, 400d, 400e would receive a ["HZ", 1] pair of values and none would generate a value over its output. In this embodiment any attempt to transmit input signal $B_j$ values all being "0" or all being "1" is avoided. In this embodiment the system 600 can achieve K bits over K data lines.

Figure 12A:
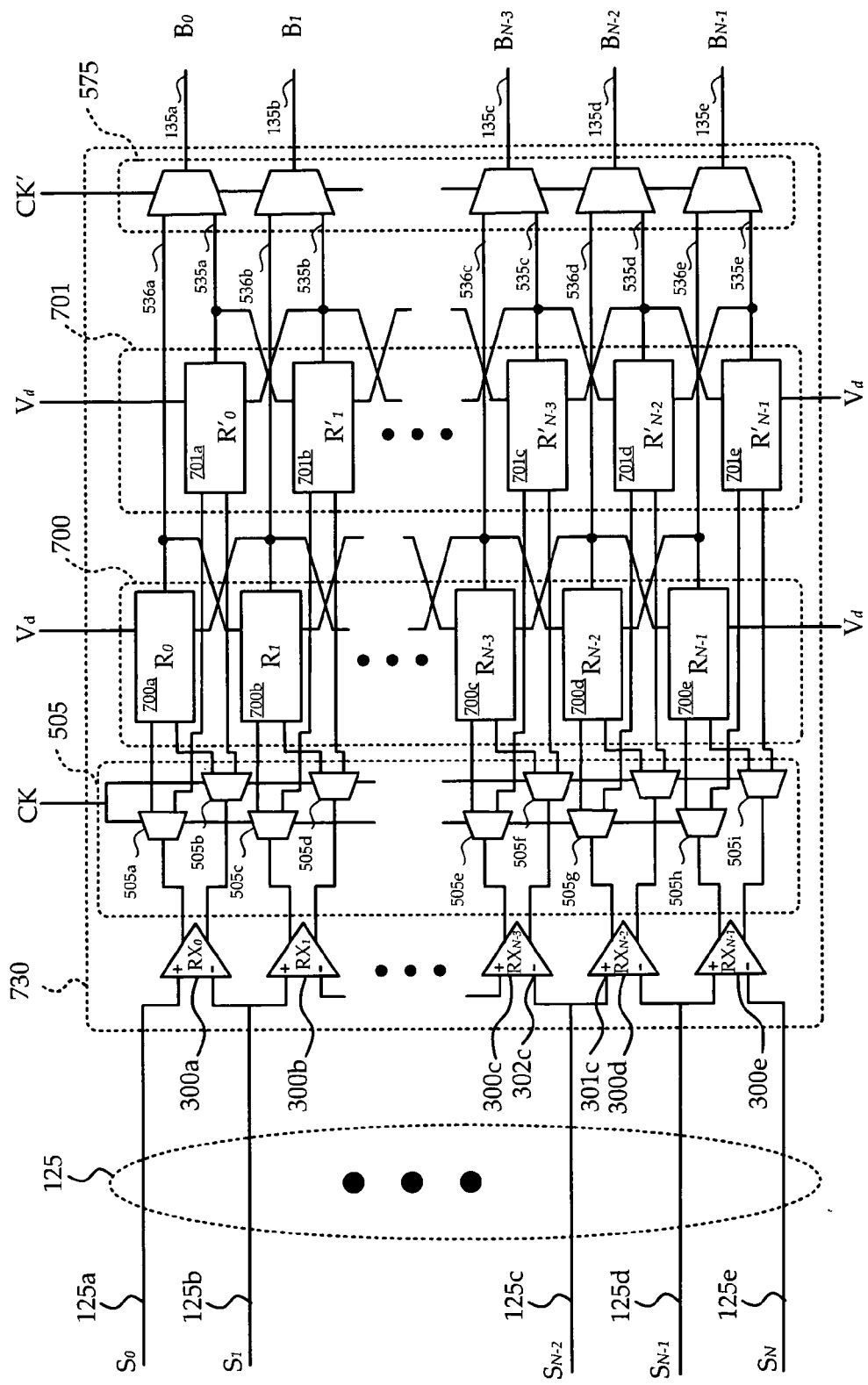
FIG. 12A is a schematic diagram of a multiplexing receiver, in accordance with another embodiment of the invention.

Referring to FIG. 12A, shown is a schematic diagram of a multiplexing receiver 730, in accordance with another embodiment of the invention. The receiver 730 is similar to the receiver of FIG. 6 except that the receiver 730 has an additional set of N restore cells ($R'_0$, ..., $R'_{N-1}$) 701 of which only five restore cells, the first 701a, second 701b, (N−2)th 701c, (N−1)th 701d, and Nth 701e are shown. Each of the transmission lines 125a, 125b, 125c, 125d, and 125e is coupled to an input of one receiver cell and is also coupled to an input of another receiver cell. For example, the (N−1)th transmission line 125c over which $S_{N-2}$ is being transmitted is coupled to a second input 302c of the (N−2)th receiver cell 300c and also to a first input 301d of the (N−1)th receiver cell 300d. Coupled behind each receiver cell is a set of switching multiplexers (MUXs) 505 forming a demultiplexing arrangement driven by a clock signal CK of which only ten MUXs 505a, 505b, 505c, 505d, 505e, 505f, 505g, 505h, 505i are shown. For example, each one of switching MUXs 505a and 505b is coupled to the receiver cell 300a. In other embodiments, the switching multiplexers (MUXs) 505 are replaced with a deserializer. The receiver 730 also has sets of restore cells 700, 701. In particular, behind each MUX 505 is coupled a restore cell from each set of MUXs 700, 701. For example, a restore cell 700a and a restore cell 701a are both coupled to the MUX 505a. The receiver 730 also has a set of switching multiplexers 575, each coupled to a respective pair of restore cells within the set of restore cells 700, 701 and forming a multiplexing arrangement. For example, a MUX 575a is coupled to restore cells 700a and 700b.

The switching multiplexers 505a to 505i cause both the INDBIT and DBIT signals from receiver cells 300a, 300b, 300c, 300d, 300e to be transmitted to a respective one of restore cells 700 selectively during one data clock cycle and then to a respective one of the other restore cells 701 during the data next cycle, continuously and repeatedly. As will be discussed further below with reference to FIG. 12B, to retain their previous states until the next update the restore cells 700, 701 have latches at their inputs to lock the state of the DBIT and INDBIT inputs. The switching multiplexers 575 are out of phase from the switching multiplexers 505 in that the outputs will be taken from one set of restore cells 700, 701 which are not currently being updated but instead was already updated less than one clock cycle in the past. This provides a delay to allow propagation of restore cell output signals over various first neighbor output lines 535a, 535b, 535c, 535d, 535e and second neighbor output lines 536a, 536b, 536c, 536d, 536e between various neighbor restore cells 700, 701 which have been input with an indirect bit INDBIT of 1.

Figure 12B:
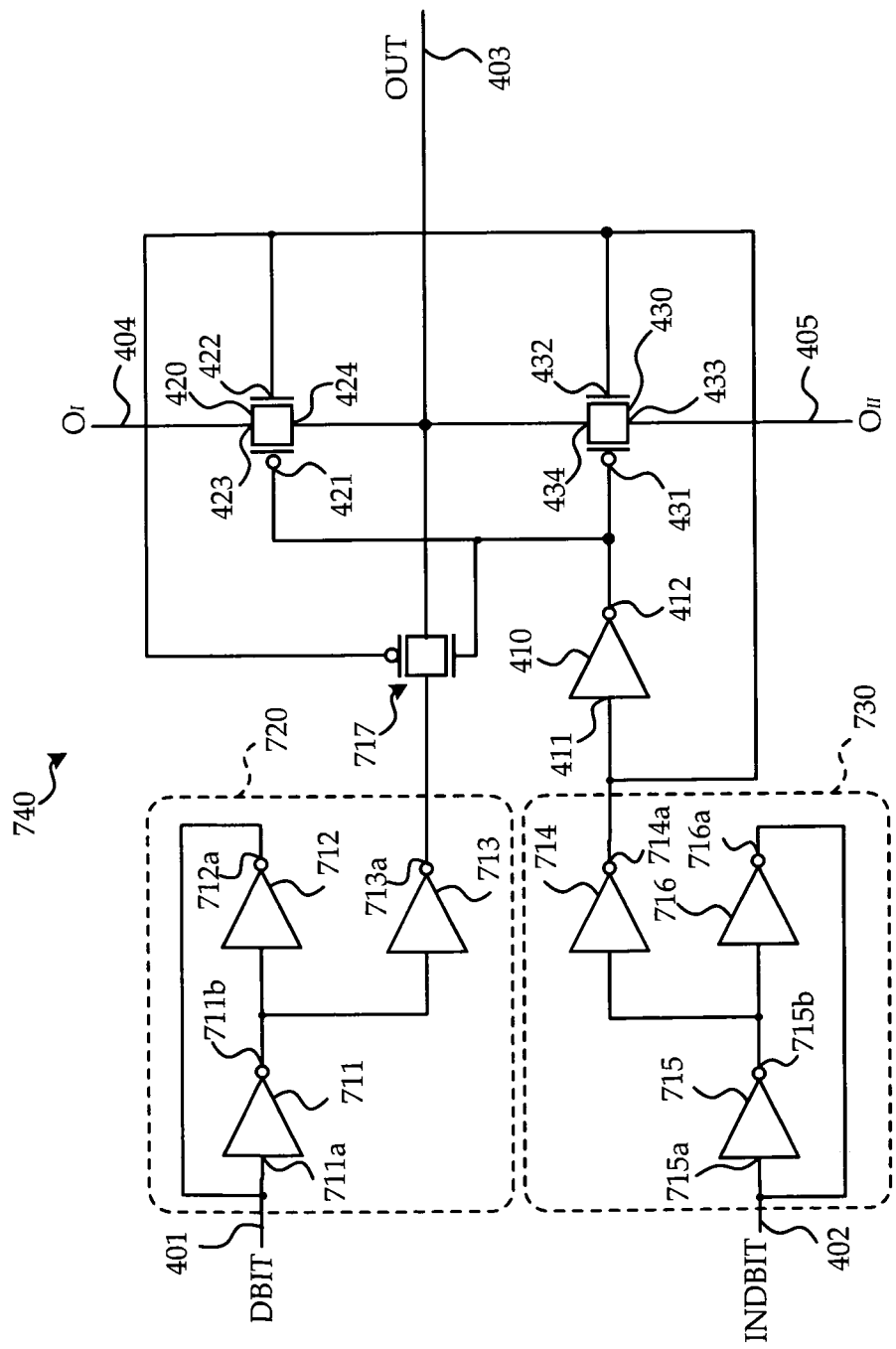
FIG. 12B is a schematic diagram of a restore cell of the multiplexing receiver of FIG. 12A.

Referring to FIG. 12B, shown is a schematic diagram of the restore cell 740 of the multiplexing receiver 730 of FIG. 12B. The restore cell 740 is similar to the restore cell 400 of FIG. 9 except that a latch circuit 720 and a pass gate 717 are coupled between the input 401 and the output 403, and a latch circuit 730 is coupled between the input 402 and the input 411 of the inverter 410. The latch circuit 720 has inverters 711, 712 coupled in series. The input 401 is coupled to an input 711a of the inverter 711 and an output 712a of the inverter 712 is also coupled to the input 711a of the inverter 711. An inverter 713 is also coupled to output 711b of the inverter 711. The latch circuit 730 has inverters 715, 716 coupled in series. The input 402 is coupled to an input 715a of the inverter 715, and an output 716a of the inverter is also coupled to the input 715a of the inverter 715. An inverter 714 is also coupled to an output 715b of the inverter 715. The pass gate is coupled to an output 713a of the inverter 713 and to the output 403. The pass gate 717 is also coupled an output 714a of the inverter 714 and to the output 412 of the inverter 410.

With reference to FIGS. 12A and 12B, the latch circuits 720, 730 are used to store the DBIT and INDBIT values while the restore cell 740 is not selected by a respective one of the MUXs 505a to 505i. This allows the restore cell 740 to maintain the same state when it is not selected. As discussed above with reference to FIG. 8 and Table II, when the value of INDBIT from a receiver cell is equal to 1 the value of DBIT received from the receiver cell is "HZ". In such case, the latch 720 prevents a previous DBIT value stored in the latch 720 from being coupled to the restore cell's output OUT when INDBIT is 1.

Figure 13A:
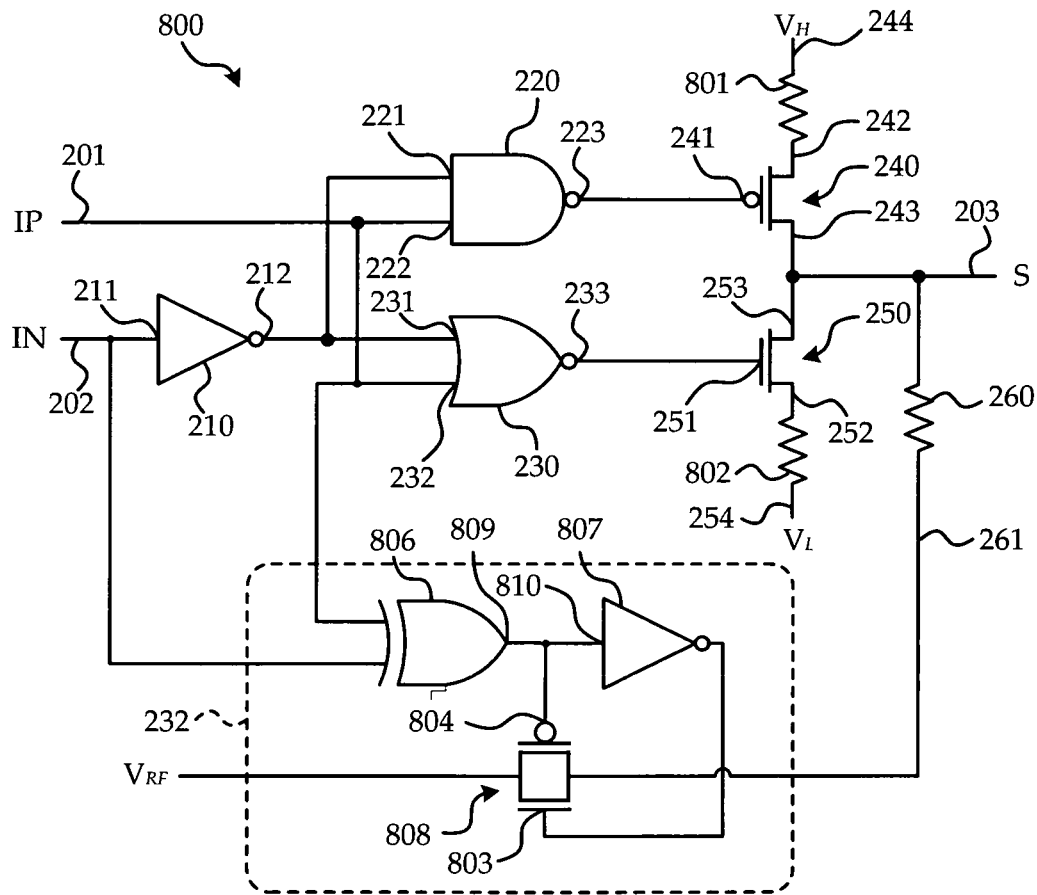
FIG. 13A is a schematic diagram of a driver cell, in accordance with another embodiment of the invention.

Referring to FIG. 13A, shown is a schematic diagram of a driver cell generally indicated by 800, in accordance with another embodiment of the invention. The driver cell 800 is similar to the driver cell 200 of FIG. 2 except that resistors 801 and 802 are coupled between the p-FET 240 and the voltage reference $V_H$ and between the n-FET 250 and the voltage reference $V_L$, respectively. Furthermore, a coupling circuit 232 is coupled between the reference Voltage $V_{RF}$ and the resistor 260. The coupling circuit 805 has an exclusive OR gate 806, an inverter 807, and a pass gate 808. The exclusive-OR gate 806 is coupled to the input IP 201 and to the input IN 202. An output 809 of the exclusive-OR gate 806 is coupled to the inverter 807 and the pass gate 808 for turning ON and OFF the pass gate 808. The inverter 807 is also coupled to the pass gate 808 to turn ON and OFF the pass gate 808. When inputs IP 201 and IN 202 are both zero or both 1 the exclusive-OR gate 806 and the inverter 807 are used to turn ON the pass gate 808 and couple the reference voltage $V_{RF}$ to the resistor 260. When the input IP 201 is zero and the input IN 202 is 1 or the input IP 201 is 1 and the input IN 202 is 0 the exclusive-OR gate 806 and the inverter 807 are used to turn OFF the pass gate 808 and disconnect the reference voltage $V_{RF}$ from the resistor 260. Advantageously, savings in power are achieved by disconnecting the reference voltage $V_{RF}$ from the resistor 260 whenever one of the p-FET 240 and the n-FET 250 is turned ON.

Figure 13B:
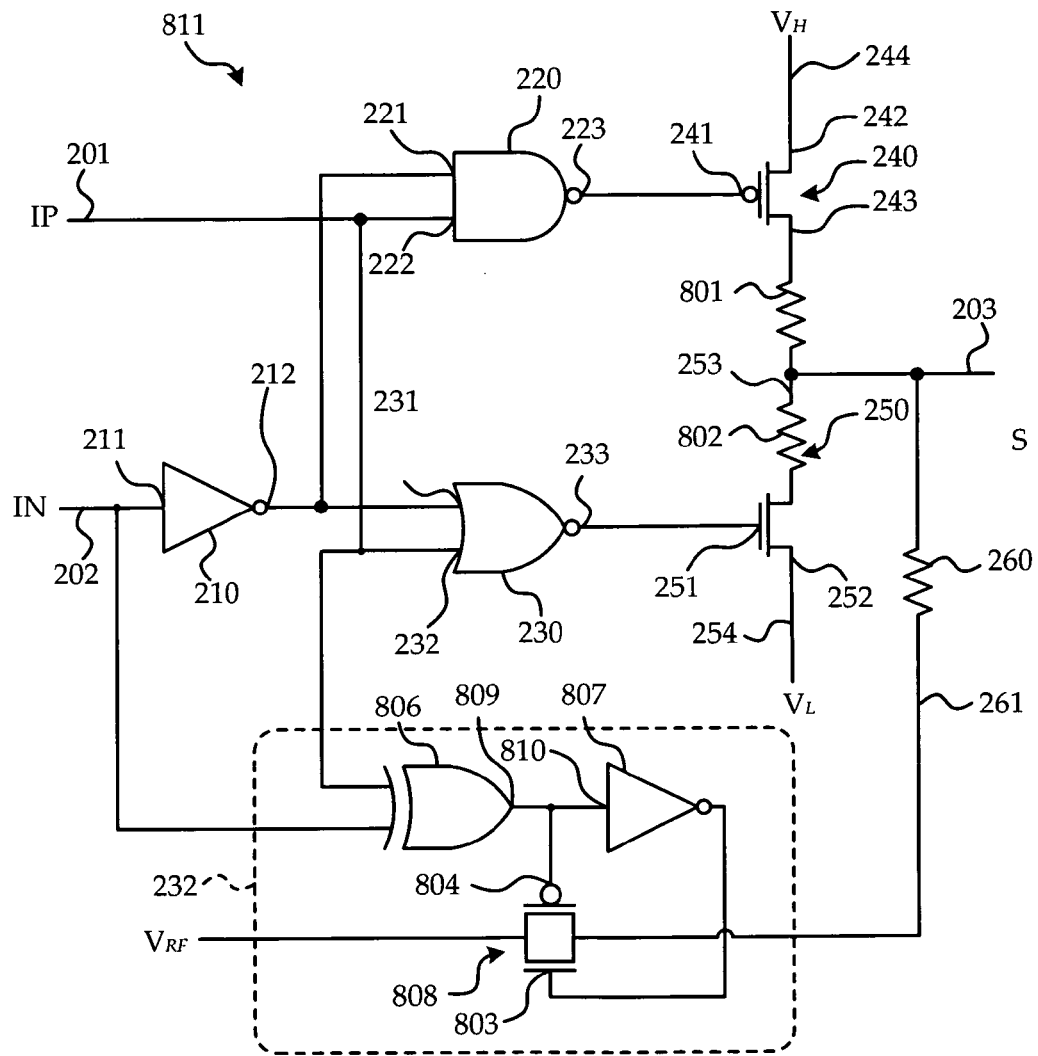
FIG. 13B is a schematic diagram of a driver cell, in accordance with another embodiment of the invention; and, FIG. 14 is a schematic diagram illustrating a data transmission system, in accordance with another embodiment of the invention.

Referring to FIG. 13B, shown is a driver cell generally indicated by 811, in accordance with another embodiment of the invention. The driver cell 811 is similar to the driver cell 810 of FIG. 13A except that resistors 801 and 802 are coupled to each other between the p-FET 240 and the n-FET 250. In both the embodiment of FIG. 13A and the embodiment of FIG. 13B advantageously the resistors 801 and 802 are used to provide matching impedances.

Figure 14:
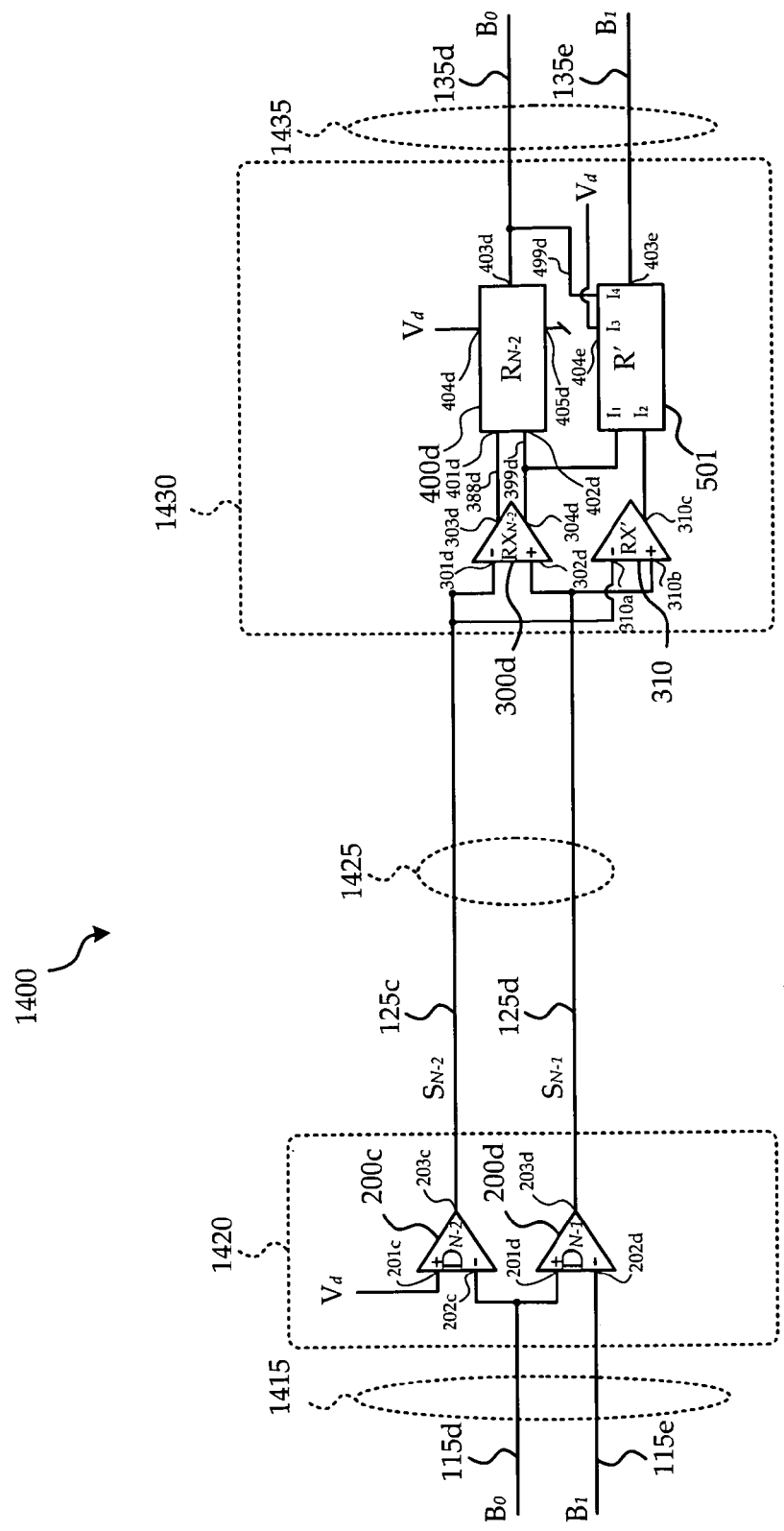

FIG. 14 is a schematic diagram illustrating a data transmission system 1400, in accordance with another embodiment of the invention. The data transmission system 1400 is a special case of the data transmission system 500 of FIG. 10A with only two transmission lines 125c, 125d. The data transmission system of FIG. 14 has data lines 115, a driver 1420, data transmission lines 1425, a receiver 1430, and recovered data lines 1435. More specifically, the data lines 115 includes two data lines 115d, 115e, the driver 1420 includes two driver cells 200c, 200d, the data transmission lines 1425 include two data transmission lines 125c, 125d, the receiver 1430 includes two receiver cells 300d, 310 and two restore cells 400d, 501, and the recovered data lines 1435 include two recovered data lines 135d, 135e. The driver 1420 and the receiver 1430 of FIG. 14 operate in the same manner as the driver 520 and the receiver 530, respectively, of FIG. 10A, except that the driver 1420 and the receiver 1430 of FIG. 14 are used for the special case of two input signals $B_0$ and $B_1$.

The embodiments presented are exemplary only and persons skilled in the art would appreciate that variations to the embodiments described above may be made without departing from the spirit of the invention. The scope of the invention is solely defined by the appended claims.

I claim:

1. A driver for differentially transmitting data over first and second data lines, the driver comprising:
driver cells for receiving a first signal comprising a digital voltage, a first input signal, and a second input signal, the first input signal and the second input signal comprising data, the driver cells comprising:
a first driver cell for receiving over a first input of the first driver cell the first signal and for receiving over a second input of the first driver cell the first input signal, and for generating over an output of the first driver cell a first 3-level transmission signal from a difference between the first signal and the first input signal; and,
a second driver cell coupled to the first driver cell for receiving over a first input of the second driver cell the first input signal and for receiving over a second input of the second driver cell the second input signal, and for generating over an output of the second driver cell a second 3-level transmission signal from a difference between the first input signal and the second input signal.

2. A driver according to claim 1 wherein each of the first driver cell and the second driver cell in generating each 3-level transmission signal generates a reference signal "0(Z)" in a case where a signal received over the first input of the driver cell is equal to a signal received over the second input of the driver cell.

3. A data transmission system for differentially transmitting data across first and second data lines, said system comprising:

a driver for receiving a first signal comprising a digital signal and a first input signal and a second input signal, the first input signal and the second input signal comprising data, wherein said driver is coupled to first ends of said first and second data lines for transmitting the data from said first end of said first ends of said first and second data lines; and a receiver coupled to second ends of said first and second data lines for receiving said transmission signals at said second end of the first and second data lines;

wherein said driver comprises:

a first driver cell for receiving over a first input of the first driver cell the first signal and for receiving over a second input of the first driver cell the first input signal, and for generating over an output of the first driver cell a first 3-level transmission signal from a difference between the first signal and the first input signal; and, a second driver cell coupled to the first driver cell for receiving over a first input of the second driver cell the first input signal and for receiving over a second input of the second driver cell the second input signal, and for generating over an output of the second driver cell a second 3-level transmission signal from a difference between the first input signal and the second input signal; and, wherein said receiver comprises a receiver cell and an input for receiving the first signal, the receiver cell comprising:

an amplifier coupled to second ends of said first and second data lines for receiving said transmission signals at said second end of the first and second data lines, and for generating over an output of the amplifier an output signal from a difference between the first 3-level transmission signal and the second 3-level transmission signal; and, a comparator coupled to the output of the amplifier and to an external reference signal for generating an output from a comparison between the output of the amplifier and the external reference signal;

wherein the receiver comprises a circuit coupled to the output from the comparator and said first signal for outputting a recovered data signal.

4. A system according to claim 3 wherein each driver cell in generating each 3-level transmission signal generates a reference signal "0(Z)" in a case where a signal received over the first input of the driver cell is equal to a signal received over the second input of the driver cell.

* * * * *